(12) United States Patent
Jiang et al.

(10) Patent No.: US 11,032,031 B2
(45) Date of Patent: Jun. 8, 2021

(54) HARQ LLR BUFFER AND REORDERING BUFFER MANAGEMENT

(71) Applicant: QUALCOMM Incorporated, San Diego, CA (US)

(72) Inventors: Jing Jiang, San Diego, CA (US); Naga Bhushan, San Diego, CA (US); Joseph Binamira Soriaga, San Diego, CA (US); Tingfang Ji, San Diego, CA (US); John Edward Smee, San Diego, CA (US); Krishna Kiran Mukkavilli, San Diego, CA (US); Lei Ke, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 352 days.

(21) Appl. No.: 15/404,072

(22) Filed: Jan. 11, 2017

(65) Prior Publication Data

US 2017/0207884 A1 Jul. 20, 2017

Related U.S. Application Data

(60) Provisional application No. 62/279,994, filed on Jan. 18, 2016.

(51) Int. Cl.
*H04L 1/18* (2006.01)
*H04L 1/00* (2006.01)
(Continued)

(52) U.S. Cl.
CPC .......... *H04L 1/1835* (2013.01); *H04L 1/0061* (2013.01); *H04L 1/08* (2013.01);
(Continued)

(58) Field of Classification Search
CPC ....... H04L 1/1835; H04L 1/1845; H04L 1/08; H04L 1/0061; H04L 1/1816; H04L 1/208; H04L 1/1819; H04L 1/1841
(Continued)

(56) References Cited

U.S. PATENT DOCUMENTS 6,345,126 B1 2/2002 Vishwanath et al.
8,996,793 B1 * 3/2015 Steiner ................ G06F 12/0246
711/103
(Continued)

FOREIGN PATENT DOCUMENTS

CA 2275775 A1 * 5/1999 ........... H04L 1/1819
CN 102474399 A 5/2012
(Continued)

OTHER PUBLICATIONS

International Search Report and Written Opinion—PCT/US2017/013193—ISA/EPO—dated Sep. 12, 2017.
(Continued)

*Primary Examiner* — Albert Decady
*Assistant Examiner* — Enam Ahmed
(74) *Attorney, Agent, or Firm* — Patterson+ Sheridan, L.L.P.

(57) ABSTRACT

Certain aspects of the present disclosure relate to methods and apparatus for management of hybrid automatic repeat request (HARQ) log likelihood ratio (LLR) and reordering buffers in wireless communication systems. According to certain aspects, a method for reducing buffer overhead that may be performed by a wireless node is provided. The method generally includes receiving one or more packets of at least one of an initial transmission or a retransmission; forming one or more log likelihood ratios (LLRs) based on
(Continued)

the one or more packets; compressing the one or more LLRs by quantizing the one or more LLRs; and buffering the one or more compressed LLRs.

19 Claims, 18 Drawing Sheets

(51) Int. Cl.
    *H04L 1/08*         (2006.01)
    *H04L 1/20*         (2006.01)

(52) U.S. Cl.
    CPC .......... *H04L 1/1845* (2013.01); *H04L 1/1816* (2013.01); *H04L 1/1819* (2013.01); *H04L 1/1841* (2013.01); *H04L 1/208* (2013.01)

(58) Field of Classification Search
    USPC ........................................................ 714/751
    See application file for complete search history.

(56) References Cited

U.S. PATENT DOCUMENTS

| | | | | |
|---|---|---|---|---|
| 2003/0167433 A1* | 9/2003 | Wengerter | ............ | H04L 1/1819 714/749 |
| 2003/0202574 A1* | 10/2003 | Budka | ............ | H04L 1/0009 375/227 |
| 2006/0133533 A1* | 6/2006 | Khandekar | ............ | H04L 1/0003 375/279 |
| 2008/0273490 A1* | 11/2008 | Sayana | ............ | H04L 1/0035 370/329 |
| 2009/0228755 A1* | 9/2009 | Franovici | ............ | H04L 1/1819 714/751 |
| 2009/0313519 A1* | 12/2009 | Nagaraja | ............ | H04L 1/1829 714/751 |
| 2010/0050034 A1* | 2/2010 | Che | ............ | H04L 1/1845 714/748 |
| 2010/0135321 A1* | 6/2010 | Kim | ............ | H04L 1/1812 370/470 |
| 2011/0158257 A1* | 6/2011 | Kwon | ............ | H04L 1/0086 370/474 |
| 2012/0033767 A1* | 2/2012 | Wilborn | ............ | H04L 25/03184 375/341 |
| 2012/0066562 A1* | 3/2012 | Riess | ............ | H03M 13/6306 714/751 |
| 2012/0140695 A1* | 6/2012 | Hunzinger | ............ | H04L 1/1812 370/315 |
| 2012/0201205 A1* | 8/2012 | Gopalakrishnan | .... | H04W 28/06 370/329 |
| 2012/0275548 A1 | 11/2012 | Oh et al. | | |
| 2013/0139020 A1* | 5/2013 | Moon | ............ | H04L 1/1893 714/751 |
| 2013/0215941 A1* | 8/2013 | Cho | ............ | H04L 1/0054 375/222 |
| 2013/0242899 A1* | 9/2013 | Lysejko | ............ | H04W 76/00 370/329 |
| 2014/0192857 A1* | 7/2014 | Perets | ............ | H04L 69/04 375/240 |
| 2014/0226613 A1 | 8/2014 | Kim et al. | | |
| 2014/0241269 A1 | 8/2014 | Smee et al. | | |
| 2016/0088635 A1* | 3/2016 | Davydov | ............ | H04L 1/1812 370/329 |
| 2016/0380724 A1* | 12/2016 | Malladi | ............ | H04L 1/0045 714/776 |
| 2017/0085354 A1* | 3/2017 | Kudekar | ............ | H04L 5/0057 |
| 2017/0171766 A1* | 6/2017 | Amizur | ............ | H04W 24/08 |
| 2017/0338915 A1* | 11/2017 | Kim | ............ | H04L 1/1812 |

FOREIGN PATENT DOCUMENTS

| | | | | |
|---|---|---|---|---|
| CN | 103001738 A | | 3/2013 | |
| WO | WO-2005018256 A1 | * | 2/2005 | ............ H04W 36/30 |

OTHER PUBLICATIONS

Partial International Search Report—PCT/US2017/013193—ISA/EPO—dated Apr. 25, 2017.

Rosati S., et al., "LLR Compression for BICM Systems Using Large Constellations," IEEE Transactions on Communications, IEEE Service Center, Piscataway, NJ. USA, Jul. 1, 2013 (Jul. 1, 2013), vol. 61(7), pp. 2864-2875, XP011522193, ISSN: 0090-6778, DOI: 10.1109/TCOMM.2013.052113.120776.

* cited by examiner

HARQ LLR BUFFER AND REORDERING BUFFER MANAGEMENT

CROSS-REFERENCE TO RELATED APPLICATION & PRIORITY CLAIM

This application claims benefit of and priority to U.S. Provisional Patent Application Ser. No. 62/279,994, filed Jan. 18, 2016, which is herein incorporated by reference in its entirety for all applicable purposes.

BACKGROUND

Field of the Disclosure

The present disclosure relates generally to wireless communication, and more particularly, to methods and apparatus for management of hybrid automatic repeat request (HARQ) log likelihood ratio (LLR) buffers and reordering buffers in wireless communication systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations (BSs), each simultaneously supporting communication for multiple communication devices, otherwise known as user equipment (UEs). In long term evolution (LTE) or LTE Advanced (LTE-A) networks, a set of one or more BSs may define an enhanced/evolved Node B (eNB). In other examples (e.g., in a next generation, new radio (NR), or 5G network), a wireless multiple-access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a gNB, an access point (AP), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). An example of an emerging telecommunication standard is NR, for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in LTE and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

The present disclosure relates generally to wireless communication, and more particularly, to methods and apparatus for management of hybrid automatic repeat request (HARQ) log likelihood ratio (LLR) buffers and reordering buffers in wireless communication systems.

Certain aspects of the present disclosure provide a method to reduce buffer overhead that can be performed by a wireless node, such as a user equipment (UE) or a base station (BS). The method generally includes receiving one or more packets of at least one of an initial transmission or a retransmission; forming one or more LLRs based on the one or more packets; compressing the one or more LLRs by quantizing the one or more LLRs; and buffering the one or more compressed LLRs.

Certain aspects of the present disclosure provide a method to reduce buffer overhead that can be performed by a wireless node, such as a UE or BS. The method generally includes receiving an initial transmission or a retransmission comprising one or more transmission blocks on at least one of multiple component carriers (CCs) or multiple HARQ interlaces; attempting to decode the one or more transmission blocks; determining whether the one or more transmission blocks were successfully decoded; storing soft LLRs associated with transmission blocks that failed to successfully decode in a shared buffer; and storing transmission blocks that were successfully decoded out-of-order in the shared buffer.

Certain aspects of the present disclosure provide a method for wireless communication that can be performed by a wireless node, such as a UE or BS. The method generally includes sending a retransmission on at least one of multiple CCs or multiple HARQ interlaces; and sending one or more parity packets associated with at least a portion of the retransmission.

Certain aspects of the present disclosure provide an apparatus having reduced buffer overhead. The apparatus generally includes means for receiving one or more packets of at least one of an initial transmission or a retransmission; means for forming one or more LLRs based on the one or more packets; means for compressing the one or more LLRs by quantizing the one or more LLRs; and means for buffering the one or more compressed LLRs.

Certain aspects of the present disclosure provide an apparatus having reduced buffer overhead. The apparatus generally includes means for receiving an initial transmission or a retransmission comprising one or more transmission blocks on at least one of multiple CCs or multiple HARQ interlaces; means for attempting to decode the one or more transmission blocks; means for determining whether the one or more transmission blocks were successfully decoded; means for storing soft LLRs associated with transmission blocks that failed to successfully decode in a shared buffer; and means for storing transmission blocks that were successfully decoded out-of-order in the shared buffer.

Certain aspects of the present disclosure provide an apparatus for wireless communication. The apparatus generally includes means for sending a retransmission on at least one of multiple CCs or multiple HARQ interlaces; and means for sending one or more parity packets associated with at least a portion of the retransmission.

Certain aspects of the present disclosure provide an apparatus having reduced buffer overhead such as a wireless node (e.g., a UE or BS). The apparatus generally includes at least one processor configured to: receive one or more packets of at least one of an initial transmission or a retransmission; form one or more LLRs based on the one or more packets; compress the one or more LLRs by quantizing the one or more LLRs; and a memory coupled with the at least one processor; and buffer the one or more compressed LLRs.

Certain aspects of the present disclosure provide an apparatus having reduced buffer overhead such as a wireless node (e.g., a UE or BS). The apparatus generally includes at least one processor configured to: receive an initial transmission or a retransmission comprising one or more transmission blocks on at least one of multiple CCs or multiple HARQ interlaces; attempt to decode the one or more transmission blocks; determine whether the one or more transmission blocks were successfully decoded; store soft LLRs associated with transmission blocks that failed to successfully decode in a shared buffer; and store transmission blocks that were successfully decoded out-of-order in the shared buffer; and a memory coupled with the at least one processor.

Certain aspects of the present disclosure provide an apparatus for wireless communications such as a wireless node (e.g., a UE or BS). The apparatus generally includes at least one processor configured to: send a retransmission on at least one of multiple CCs or multiple HARQ interlaces; and send one or more parity packets associated with at least a portion of the retransmission; and a memory coupled with the at least one processor.

Certain aspects of the present disclosure provide a computer readable medium having computer executable code stored thereon for reducing buffer overhead. The computer executable code generally includes code for receiving one or more packets of at least one of an initial transmission or a retransmission; code for forming one or more LLRs based on the one or more packets; code for compressing the one or more LLRs by quantizing the one or more LLRs; and code for buffering the one or more compressed LLRs.

Certain aspects of the present disclosure provide a computer readable medium having computer executable code stored thereon for reducing buffer overhead. The computer executable code generally includes code for receiving an initial transmission or a retransmission comprising one or more transmission blocks on at least one of multiple CCs or multiple HARQ interlaces; code for attempting to decode the one or more transmission blocks; code for determining whether the one or more transmission blocks were successfully decoded; code for storing soft LLRs associated with transmission blocks that failed to successfully decode in a shared buffer; and code for storing transmission blocks that were successfully decoded out-of-order in the shared buffer.

Certain aspects of the present disclosure provide a computer readable medium having computer executable code stored thereon for wireless communications. The computer executable code generally includes code for sending a retransmission on at least one of multiple CCs or multiple HARQ interlaces; and code for sending one or more parity packets associated with at least a portion of the retransmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
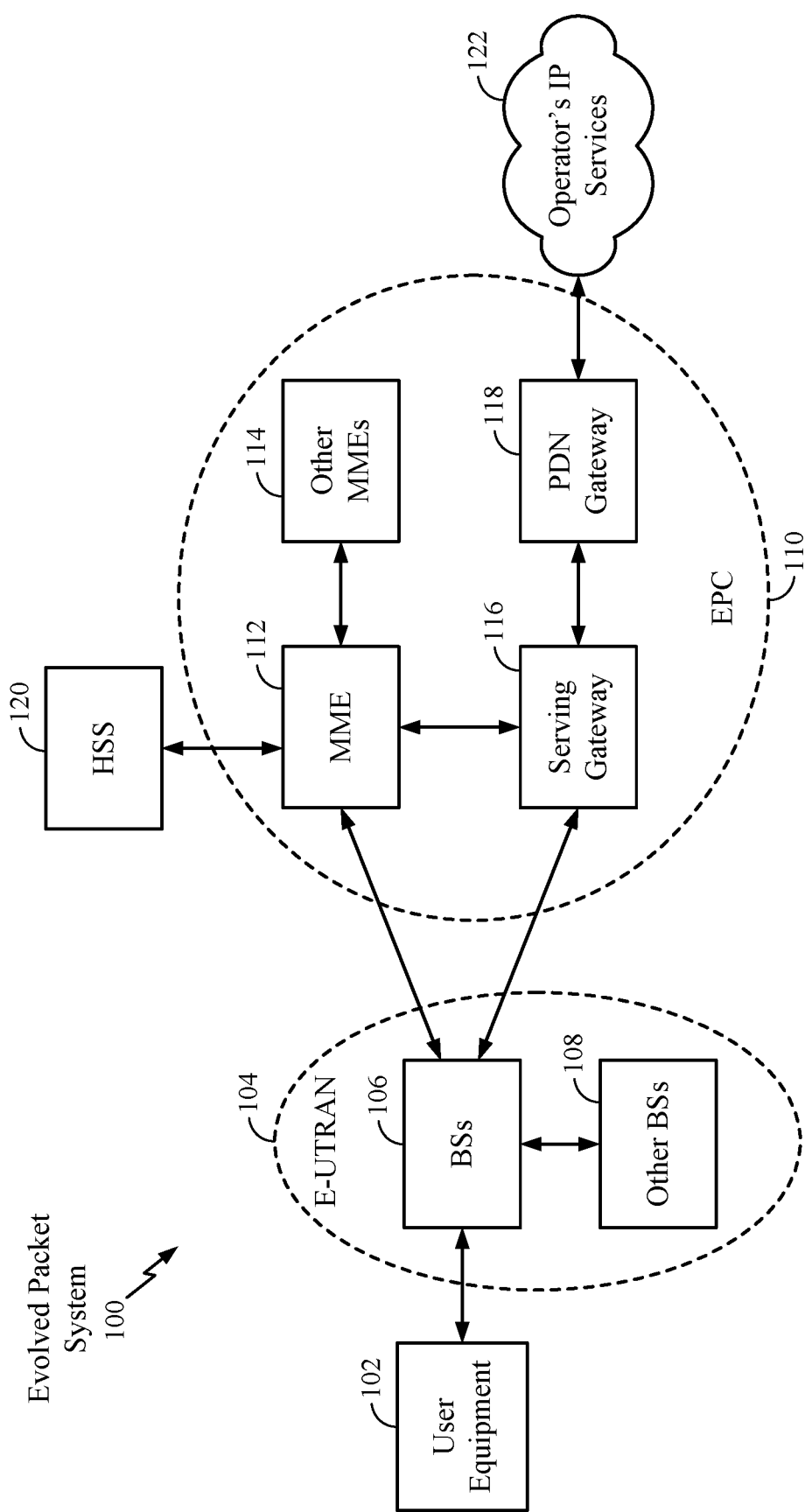
FIG. 1 is a diagram illustrating an example of a network architecture.

Aspects of the present disclosure provide apparatus, methods, processing systems, and computer readable mediums for hybrid automatic repeat request (HARQ) log-likelihood ratio (LLR) buffer and reordering buffer management.

Aspects of the present disclosure may be used for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive machine type communications (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Scaling of conventional hybrid automatic repeat request (HARQ) buffer management of certain systems, such as long term evolution (LTE) HARQ may lead to high overhead for other systems that support higher throughput, for example, NR systems such as 5G systems. Aspects of the present disclosure provide techniques for HARQ LLR buffer and ARQ reordering buffer management. For example, these techniques include low bitwidth LLR quantization and/or a joint LLR and reordering buffer.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as LTE, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as NR (e.g., 5G radio access), Evolved UTRA (E-UTRA), IEEE 802.11 (Wi-Fi), IEEE 802.16 (WiMAX), IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). NR is an emerging wireless communications technology under development in conjunction with the 5G Technology Forum (5GTF). These communications networks are merely listed as examples of networks in which the techniques described in this disclosure may be applied; however, this disclosure is not limited to the above-described communications network. For clarity, while aspects may be described herein using terminology commonly associated with 3G and/or 4G wireless technologies, aspects of the present disclosure can be applied in other generation-based communication systems, such as NR technologies, including 5G and later.

Example Wireless Communications Systems

FIG. 1 is a diagram illustrating a network architecture 100 in which aspects of the present disclosure may be practiced. For example, the wireless network may be a new radio (NR) or 5G network. BSs 106 and/or UEs 120 may be configured to perform the operations 1200, 1500, and 1900 and methods described herein for hybrid automatic repeat request (HARQ) LLR buffer and reordering buffer management.

For example, a receiver, such as a wireless node (e.g., a UE 102 or BS 106) may receive packets in a transmission or a retransmission from a transmitter (e.g., UE 102 or BS 106). The receiver may form one or more log likelihood ratios (LLRs) based on the one or more packets received from the transmitter and compress the one or more LLRs by quantizing the LLRs and mapping combinations of groups of quantized LLRs to bits. In addition, or alternatively, the receiver may store LLRs of failed transmission blocks in a shared buffer and may also store successfully decoded transmission blocks in the shared buffer.

The network architecture 100 may be referred to as an Evolved Packet System (EPS) 100 (e.g., long term evolution (LTE)). EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. EPS 100 can interconnect with other access networks, but for simplicity those entities/interfaces are not shown. Exemplary other access networks may include an IP Multimedia Subsystem (IMS) packet data network (PDN), Internet PDN, Administrative PDN (e.g., Provisioning PDN), carrier-specific PDN, operator-specific PDN, and/or Global Positioning System (GPS) PDN. As shown, the EPS provides packet-switched (PS) services, however, as those skilled in the art will readily appreciate, the various concepts presented throughout this disclosure may be extended to networks providing circuit-switched (CS) services.

A UE 102 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

The E-UTRAN includes the base station (BS) 106 and other BSs 108. The BS 106 provides user and control plane protocol terminations toward the UE 102. The BS 106 may be connected to the other BSs 108 via an X2 interface (e.g., backhaul). The BS 106 may also be referred to as a base transceiver station, a radio base station, a radio transceiver, a transceiver function, a basic service set (BSS), an extended service set (ESS), an access point, an enhanced/evolved Node B (eNB), or some other suitable terminology. The BS 106 may provide an access point to the EPC 110 for a UE 102.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

The BS 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the network architecture 100.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed. While aspects of the examples described herein may be associated with LTE technologies, aspects of the present disclosure may be applicable with other wireless communications systems, such as NR or 5G.

Figure 2:
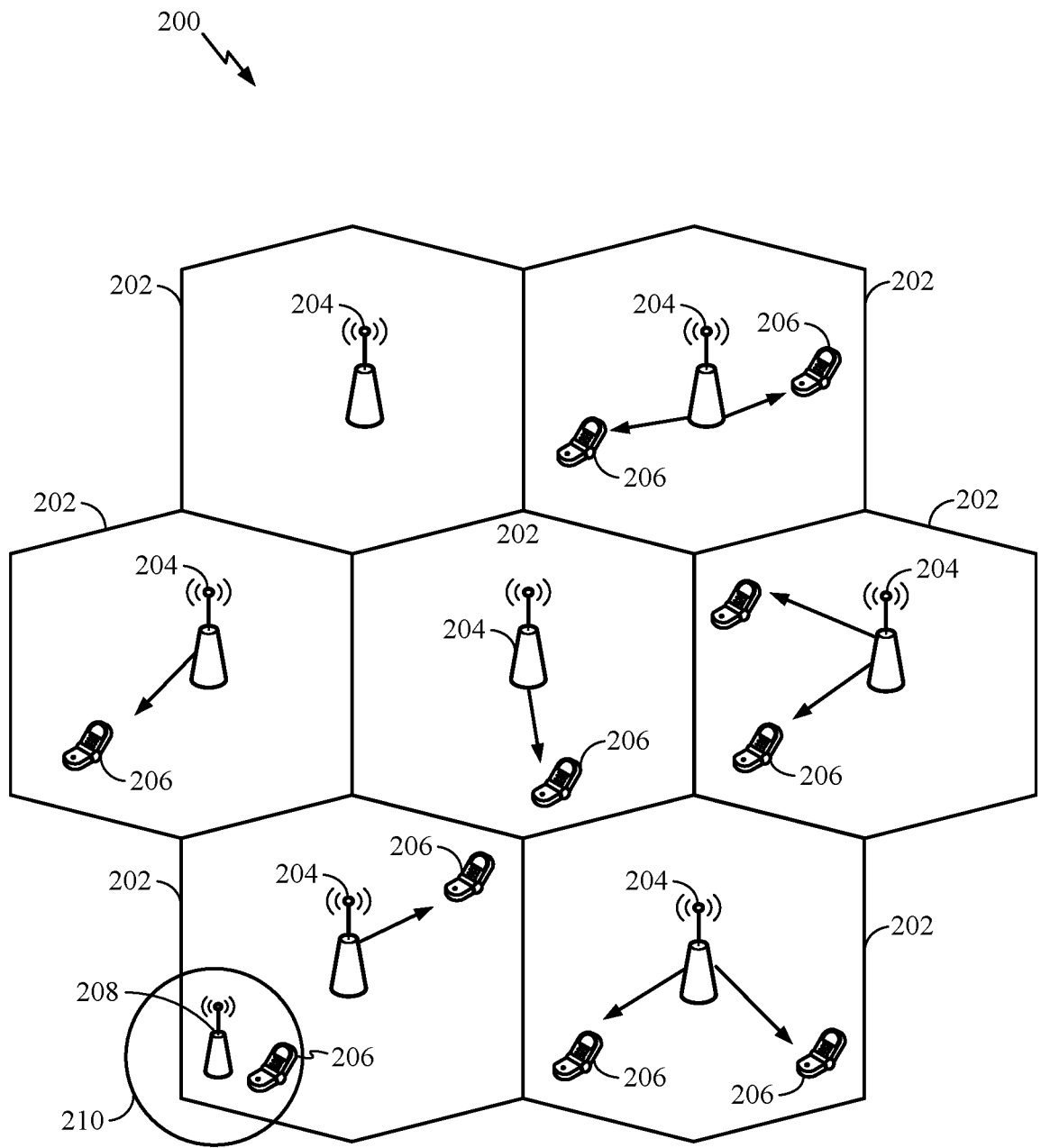
FIG. 2 is a diagram illustrating an example of an access network.

FIG. 2 is a diagram illustrating an example of an access network 200 in a network architecture in which aspects of the present disclosure may be practiced. For example, BSs 204 and UEs 206 may be configured to implement techniques for HARQ LLR buffer and reordering buffer management, in accordance with certain aspects of the present disclosure.

In this example, access network 200 is divided into a number of cellular regions (cells) 202. One or more lower power class BSs 208 may have cellular regions 210 that overlap with one or more of the cells 202. A lower power class BS 208 may be referred to as a remote radio head (RRH). The lower power class BS 208 may be a femto cell (e.g., home BS), pico cell, or micro cell. The macro BSs 204 are each assigned to a respective cell 202 and are configured to provide an access point to the EPC 110 for all the UEs 206 in the cells 202. There is no centralized controller in this example of access network 200, but a centralized controller may be used in alternative configurations. BSs 204 are responsible for all radio related functions including radio bearer control, admission control, mobility control, scheduling, security, and connectivity to the serving gateway 116. Access network 200 may also include one or more relays (not shown). According to aspects, a UE may serve as a relay.

In NR systems, the term "cell" and gNB, Node B, 5G NB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

The modulation and multiple access scheme employed by access network 200 may vary depending on the particular telecommunications standard being deployed. As those skilled in the art will readily appreciate from the detailed description to follow, the various concepts presented herein are well suited for certain applications, such as LTE, NR, and 5G. However, these concepts may be readily extended to other telecommunication standards employing other modulation and multiple access techniques. The actual wireless communication standard and the multiple access technology employed will depend on the specific application and the overall design constraints imposed on the system.

BSs 204 may have multiple antennas supporting MIMO technology. The use of MIMO technology enables the BSs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables BS 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

In some examples, access to the air interface may be scheduled. A scheduling entity (e.g., a BS) can allocate resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 3:
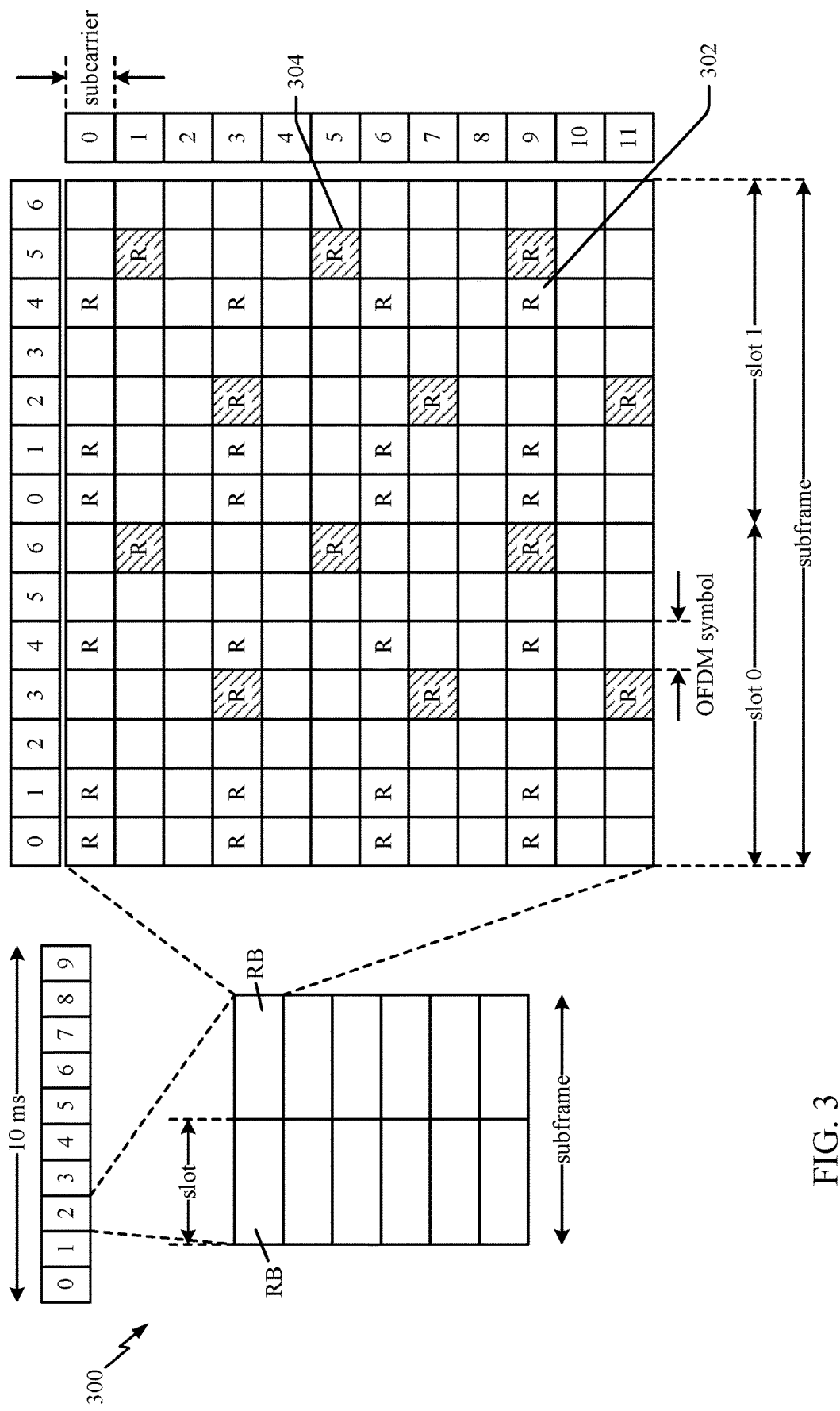
FIG. 3 is a diagram illustrating an example of a DL frame structure in an access network.

FIG. 3 is a diagram 300 illustrating an example of a DL frame structure in an access network (e.g., LTE). A frame (10 ms) may be divided into 10 equally sized subframes with indices of 0 through 9. Each sub-frame may include two consecutive time slots. A resource grid may be used to represent two time slots, each time slot including a resource block (RB). The resource grid is divided into multiple resource elements. In certain systems (e.g., LTE), a RB contains 12 consecutive subcarriers in the frequency domain and, for a normal cyclic prefix in each OFDM symbol, 7 consecutive OFDM symbols in the time domain, or 84 resource elements (REs). For an extended cyclic prefix, a RB contains 6 consecutive OFDM symbols in the time domain and has 72 REs. Some of the REs, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the RBs upon which the corresponding physical DL shared channel (PDSCH) is mapped. The number of bits carried by each RE depends on the modulation scheme. Thus, the more RBs that a UE receives and the higher the modulation scheme, the higher the data rate for the UE.

In certain systems (e.g., LTE), a BS may send a primary synchronization signal (PSS) and a secondary synchronization signal (SSS) for each cell in the BS. The PSS and SSS may be sent in symbol periods 6 and 5, respectively, in each of subframes 0 and 5 of each radio frame with the normal cyclic prefix (CP). The synchronization signals may be used by UEs for cell detection and acquisition. The BS may send a Physical Broadcast Channel (PBCH) in symbol periods 0 to 3 in slot 1 of subframe 0. The PBCH may carry certain system information.

The BS may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 RBs. The BS may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The BS may send a Physical Downlink Shared Channel (PDSCH) in the remaining symbol periods of each subframe. The PDSCH may carry data for UEs scheduled for data transmission on the downlink.

The BS may send the PSS, SSS, and PBCH in the center 1.08 MHz of the system bandwidth used by the BS. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of REs may be available in each symbol period. Each RE may cover one subcarrier in one symbol period and may be used to send one modulation symbol, which may be a real or complex value. REs not used for a reference signal in each symbol period may be arranged into resource element groups (REGs). Each REG may include four REs in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

Figure 4:
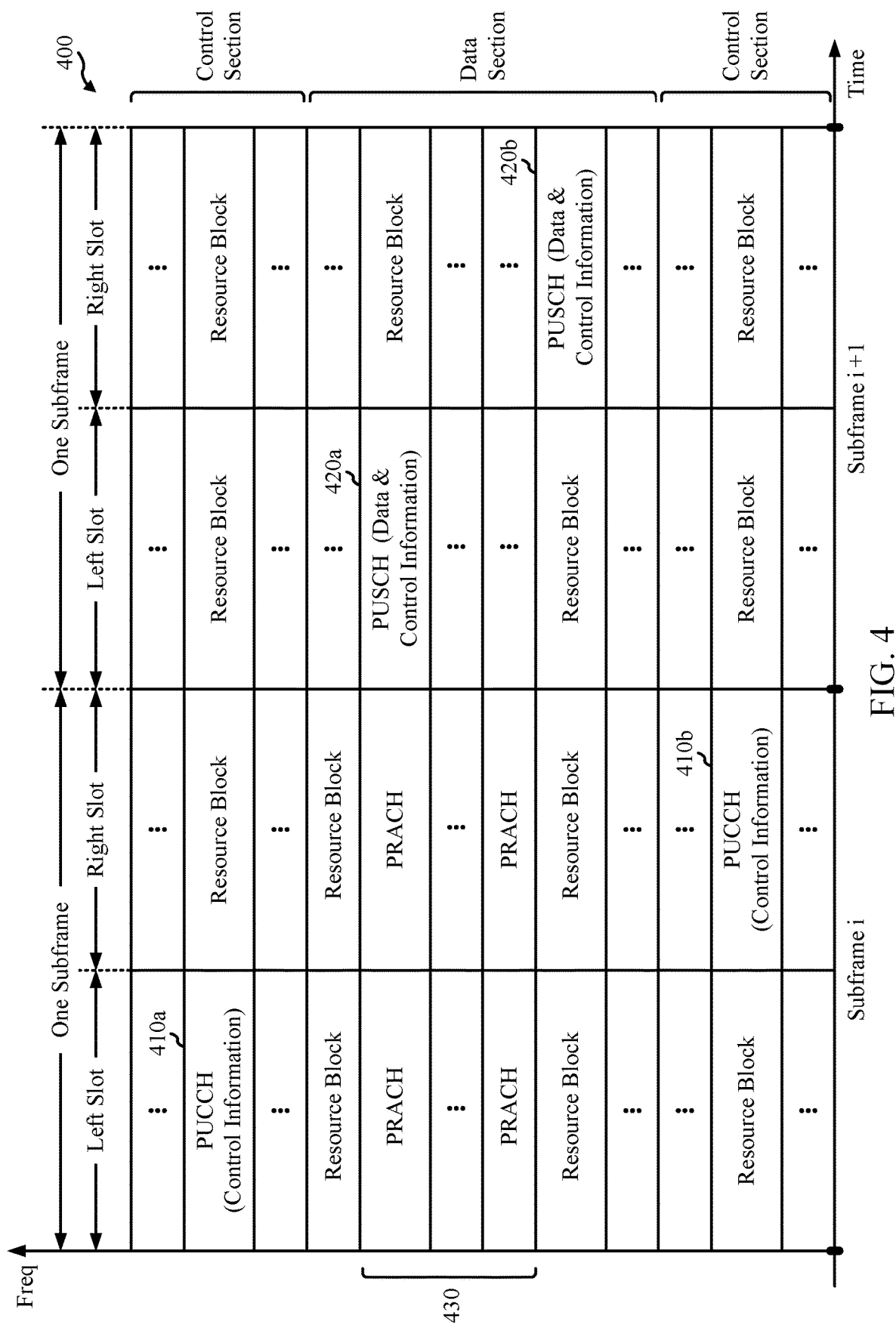
FIG. 4 is a diagram illustrating an example of an UL frame structure in an access network.

FIG. 4 is a diagram 400 illustrating an example of an UL frame structure in a wireless communications system (e.g., LTE). The available RBs for the UL may be partitioned into a data section and a control section. The control section may be formed at the two edges of the system bandwidth and may have a configurable size. The RBs in the control section may be assigned to UEs for transmission of control information. The data section may include all RBs not included in the control section. The UL frame structure results in the data section including contiguous subcarriers, which may allow a single UE to be assigned all of the contiguous subcarriers in the data section.

A UE may be assigned RBs 410a, 410b in the control section to transmit control information to a BS. The UE may also be assigned RBs 420a, 420b in the data section to transmit data to the BS. The UE may transmit control information in a physical UL control channel (PUCCH) on the assigned RBs in the control section. The UE may transmit only data or both data and control information in a physical UL shared channel (PUSCH) on the assigned RBs in the data section. A UL transmission may span both slots of a subframe and may hop across frequency.

A set of RBs may be used to perform initial system access and achieve UL synchronization in a physical random access channel (PRACH) 430. PRACH 430 carries a random sequence and cannot carry any UL data/signaling. Each random access preamble occupies a bandwidth corresponding to six consecutive RBs. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

In other systems (e.g., such NR or 5G systems), a BS may transmit these or other signals in these locations or in different locations of the subframe. As will described in more detail below with respect to FIGS. 9 and 10, in other systems (e.g., NR or 5G systems), different uplink and/or downlink frame structures may be used.

Figure 5:
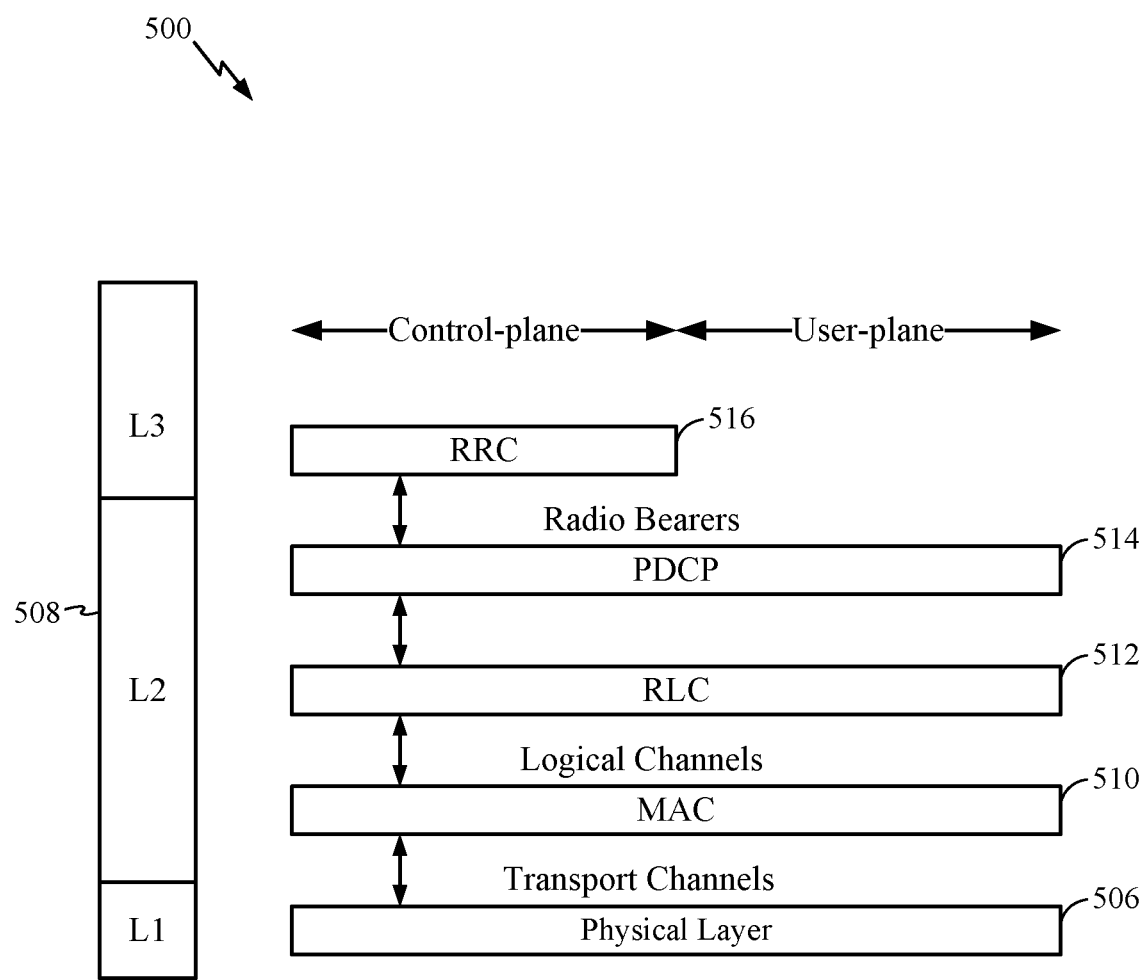
FIG. 5 is a diagram illustrating an example of a radio protocol architecture for the user and control plane.

FIG. 5 is a diagram 500 illustrating an example of a radio protocol architecture for the user and control planes in an example wireless communications systems (e.g., LTE). The radio protocol architecture for the UE and the BS is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and BS over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the BS on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between BSs. The RLC sublayer 512 provides segmentation and reassembly of upper layer data packets, retransmission of lost data packets, and reordering of data packets to compensate for out-of-order reception due to HARQ. The MAC sublayer 510 provides multiplexing between logical and transport channels. The MAC sublayer 510 is also responsible for allocating the various radio resources (e.g., RBs) in one cell among the UEs. The MAC sublayer 510 is also responsible for HARQ operations.

In the control plane, the radio protocol architecture for the UE and BS is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the BS and the UE.

Figure 6:
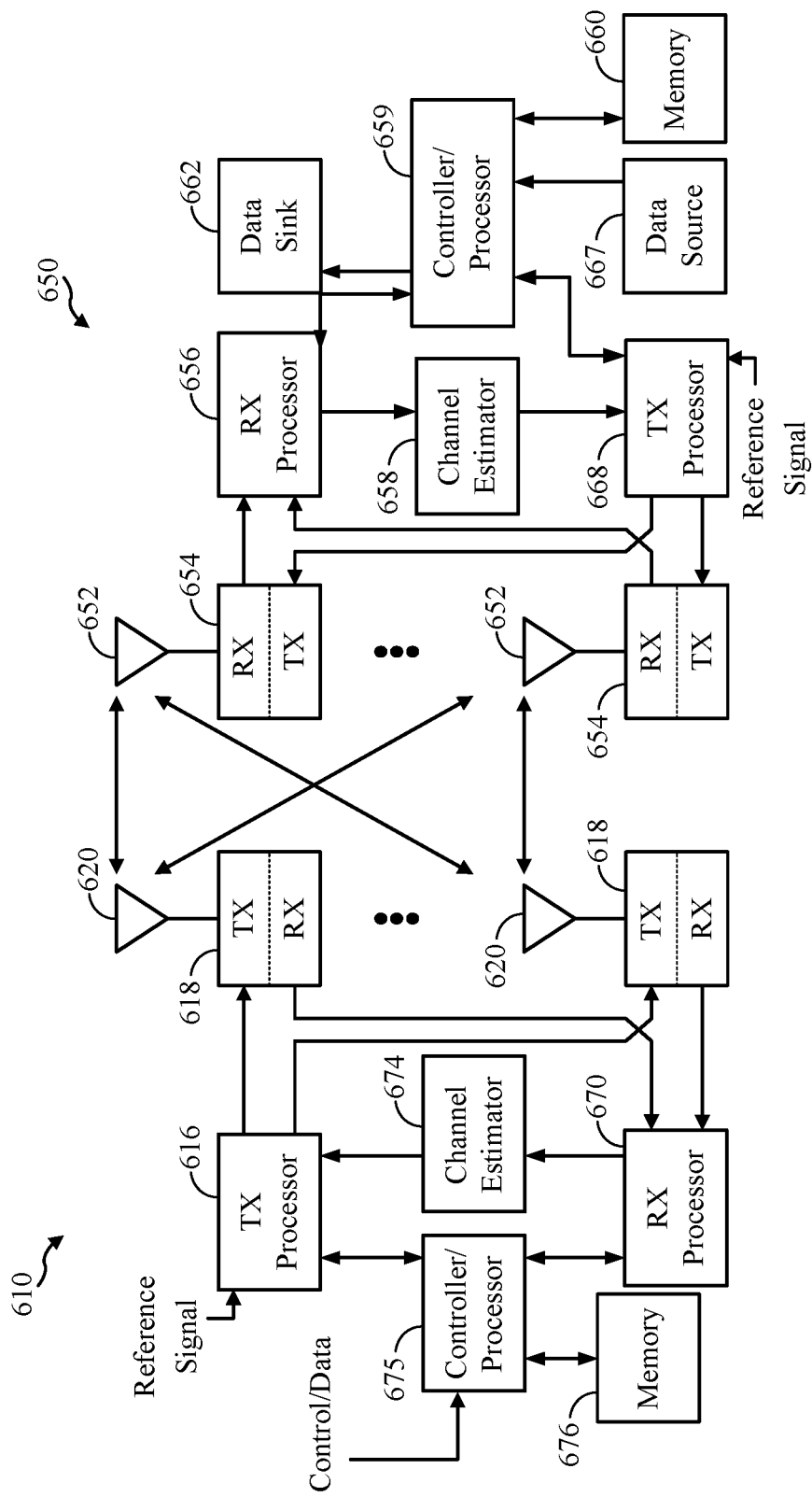
FIG. 6 is a diagram illustrating an example of a base station (BS) and user equipment (UE) in an access network, in accordance with certain aspects of the disclosure.

FIG. 6 is a block diagram of a BS 610 in communication with a UE 650 in an access network, in which aspects of the present disclosure may be practiced.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the BS 610. These soft decisions may be based on channel estimates computed by the channel estimator 658. The soft decisions are then decoded and deinterleaved to recover the data and control signals that were originally transmitted by the BS 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by BS 610, the controller/processor 659 implements the L2 layer for the user plane and the control plane by providing header compression, ciphering, packet segmentation and reordering, and multiplexing between logical and transport channels based on radio resource allocations by BS 610. Controller/processor 659 is also responsible for HARQ operations, retransmission of lost packets, and signaling to the BS 610.

Channel estimates derived by a channel estimator 658 from a reference signal or feedback transmitted by BS 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at BS 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. Controller/processor 675 can be associated with a memory 676 that stores program codes and data. The memory 676 may be referred to as a computer-readable medium. In the UL, control/processor 675 provides demultiplexing between transport and logical channels, packet reassembly, deciphering, header decompression, control signal processing to recover upper layer packets from UE 650. Upper layer packets from controller/processor 675 may be provided to the core network. Controller/processor 675 is also responsible for error detection using an ACK and/or NACK protocol to support HARQ operations. The controllers/processors 675, 659 may direct the operations at the BS 610 and UE 650, respectively.

Figure 12:
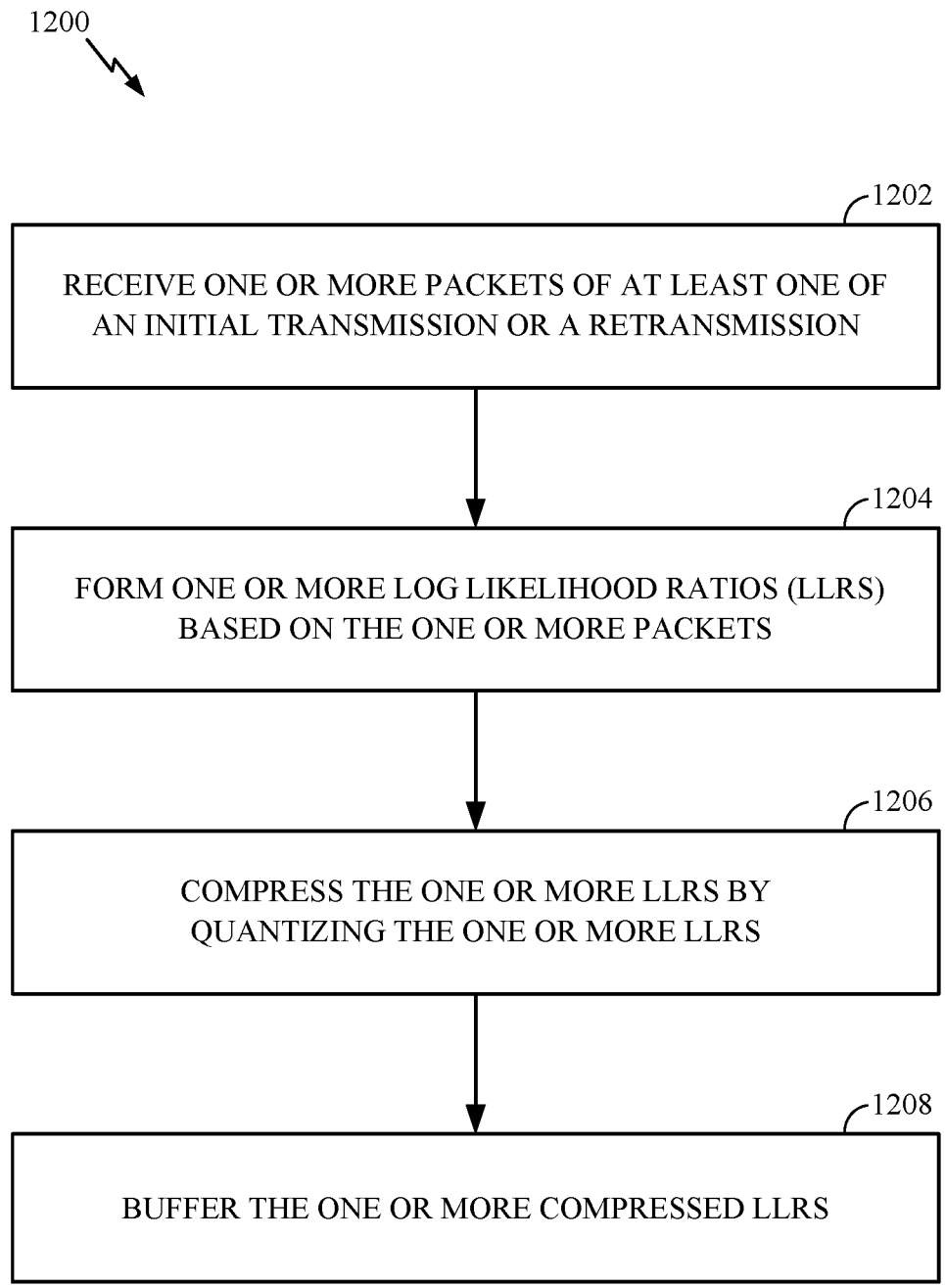
FIG. 12 is a flow diagram illustrating example operations for log-likelihood ratio (LLR) buffer management by a receiver, in accordance with certain aspects of the present disclosure.
Figure 15:
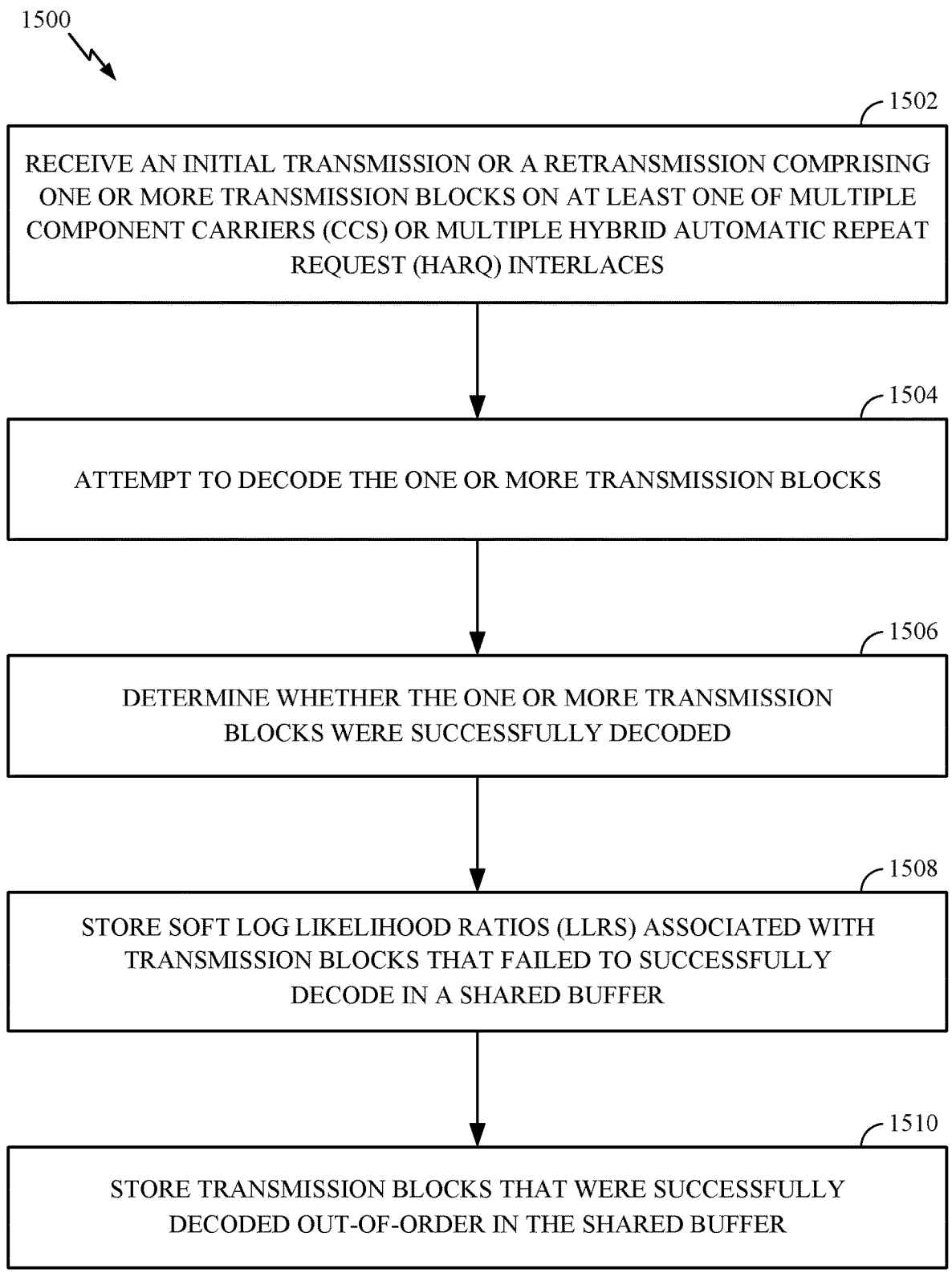
FIG. 15 is a flow diagram illustrating example operations for shared HARQ LLR buffer and reordering buffer management by a receiver, in accordance with certain aspects of the present disclosure.
Figure 19:
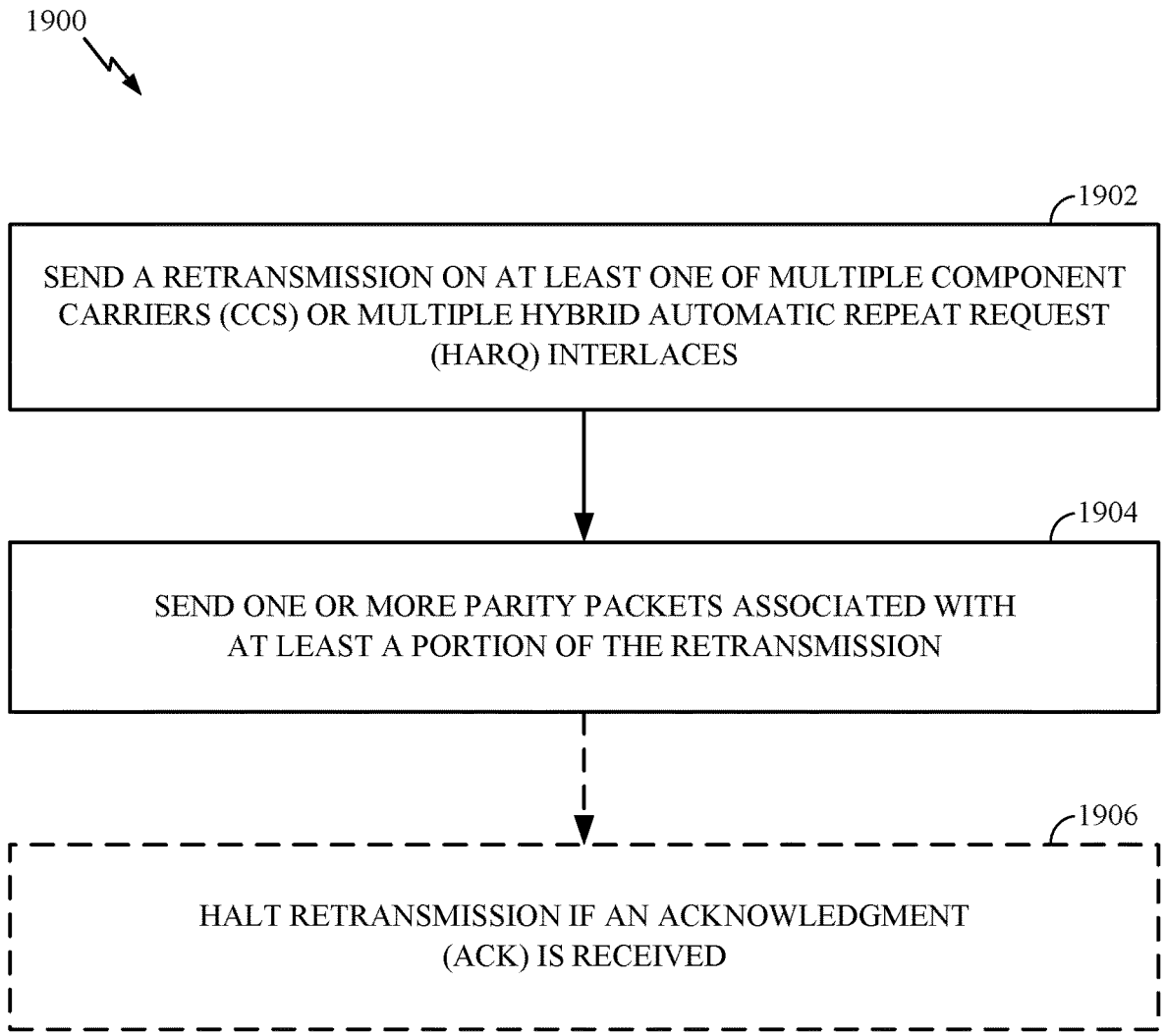
FIG. 19 is a flow diagram illustrating example operations for wireless communications by a transmitter, in accordance with certain aspects of the present disclosure.

Controller/processor 675 and/or other processors and modules at BS 610 and controller/processor 659 and/or other processors and modules at UE 650 may perform or direct operations, for example, operations 1200 in FIG. 12, operations 1500 in FIG. 15, operations 1900 in FIG. 19, and/or other processes for the techniques described herein for HARQ LLR buffer and reordering buffer management. The memories 660 and 676 may store data and program codes for the UE 650 and BS 610 respectively, accessible and executable by one or more other components of the UE 650 and the BS 610.

Example NR/5G RAN Architecture

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 75 kHz over a 0.1 ms duration or a bandwidth of 15 kHz over a 1 ms duration. Each radio frame may consist of 10 or 50 subframes with a length of 10 ms. Each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
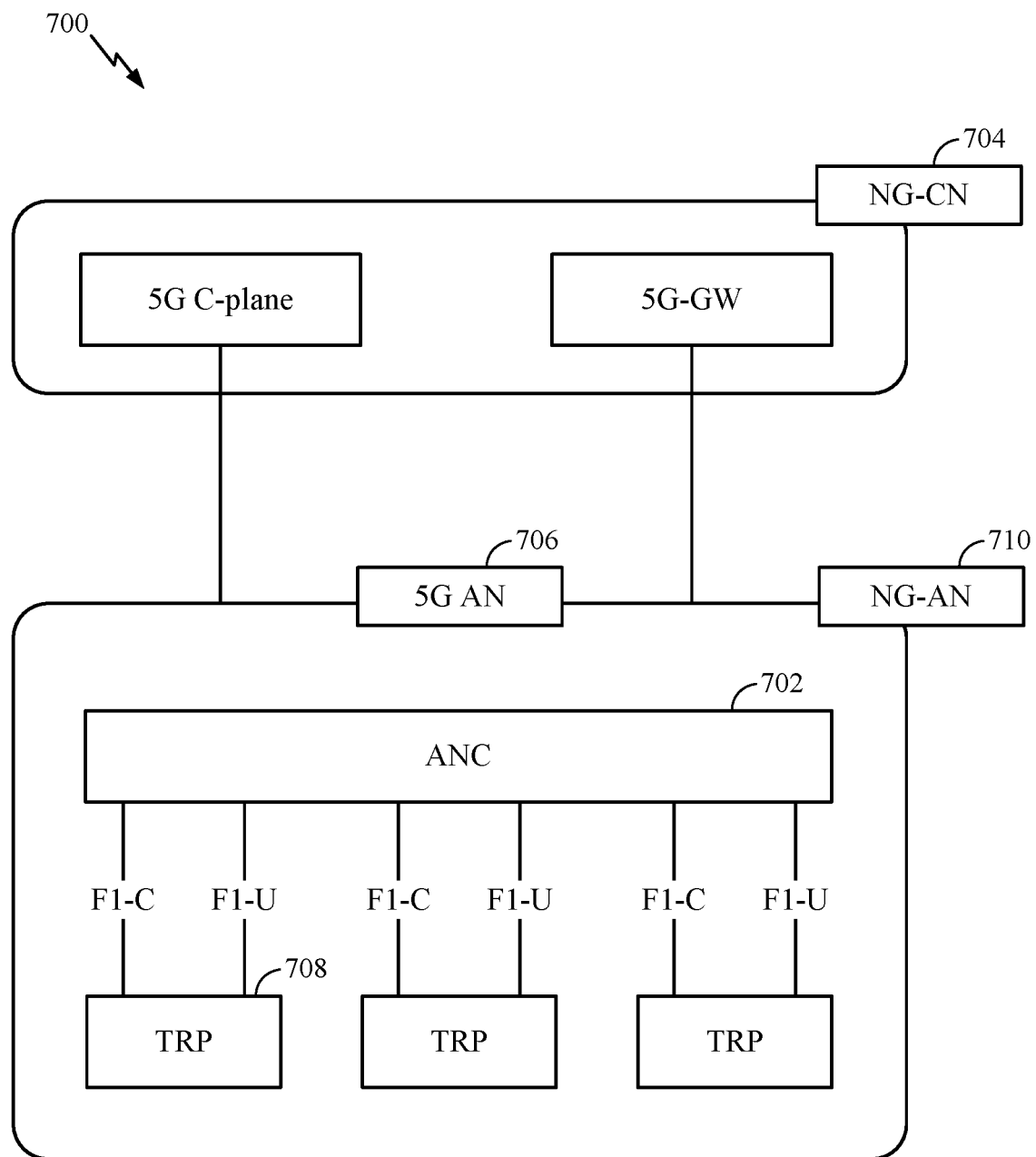
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

Figure 8:
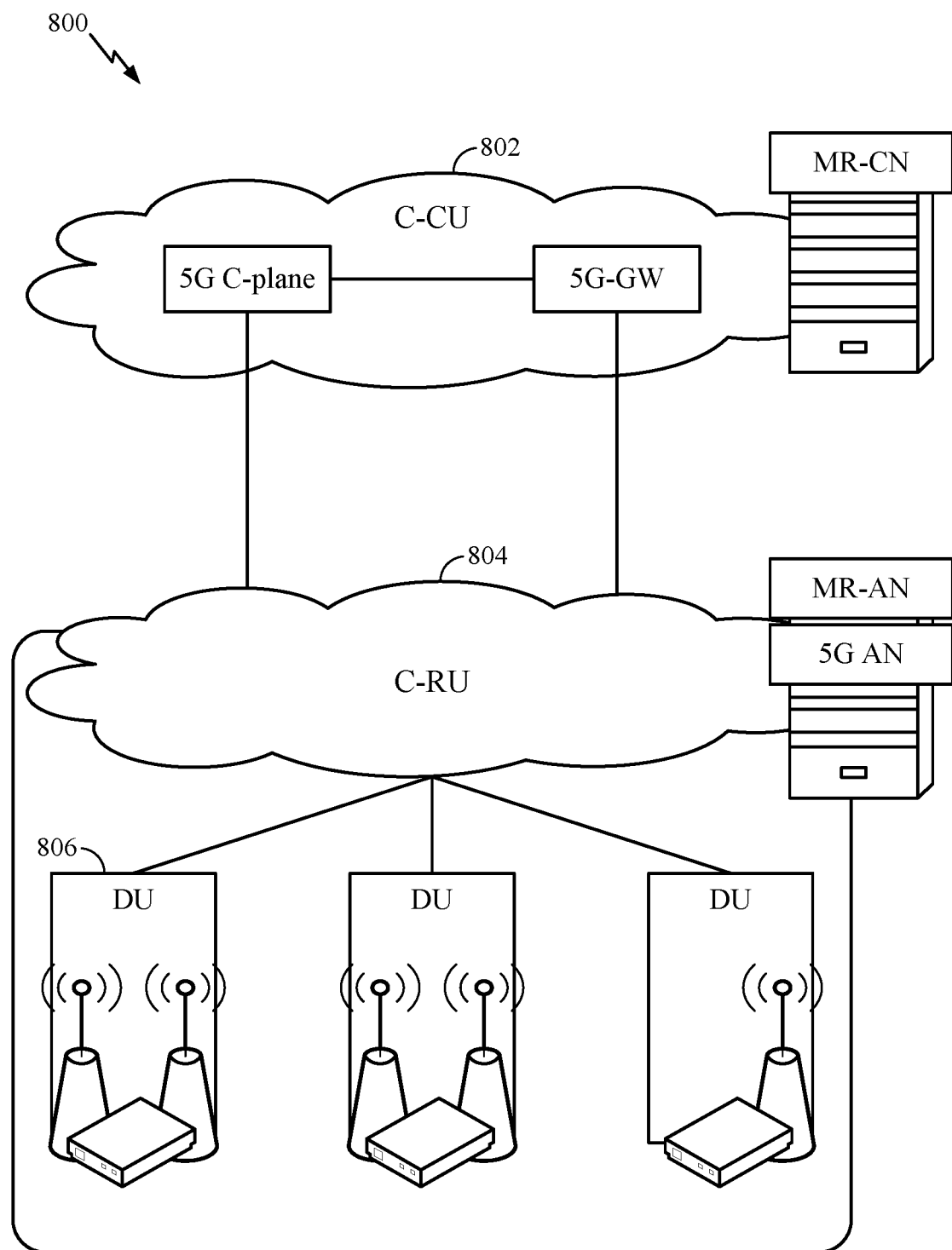
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity. A centralized RAN unit (C-RU) 804 may host one or more ANC functions. Optionally, the C-RU may host core network functions locally. The C-RU may have distributed deployment. The C-RU may be closer to the network edge. A distributed unit (DU) 706 may host one or more TRPs. The DU may be located at edges of the network with radio frequency (RF) functionality.

Figure 9:
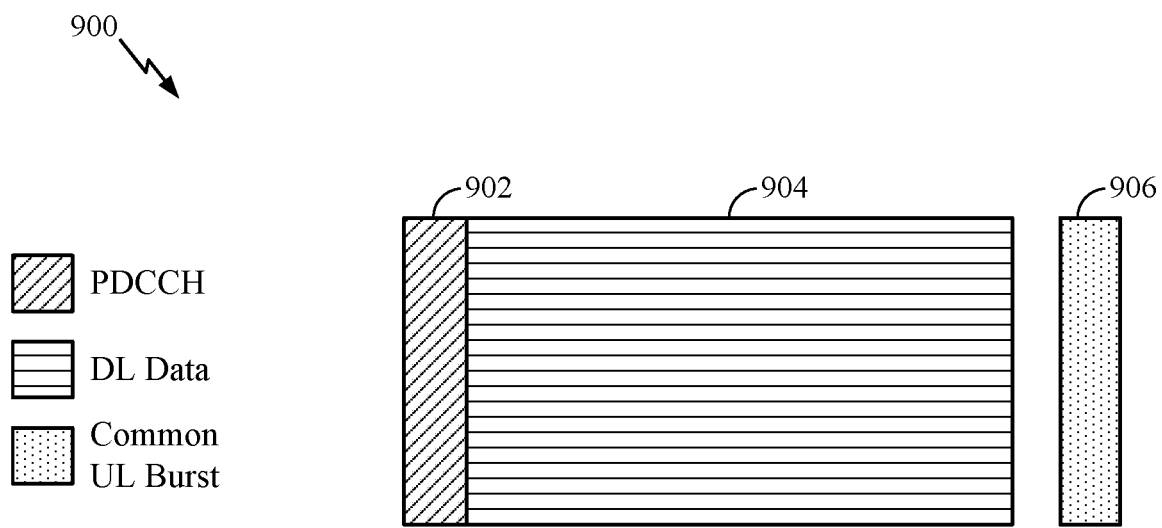
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
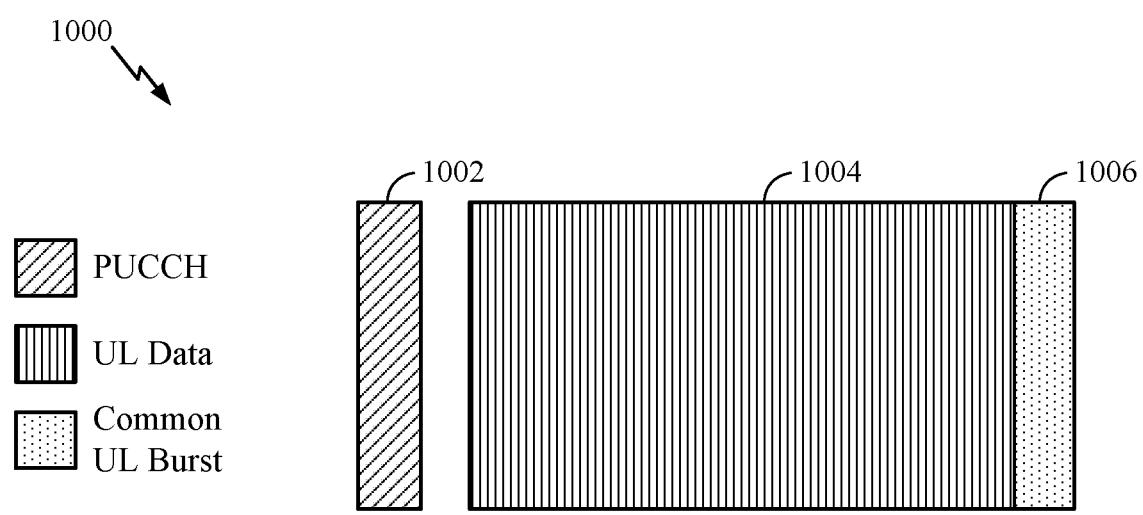
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical UL control channel (PUCCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum)

Example HARQ LLR Buffer and Reordering Buffer Management

Hybrid automatic repeat request (HARQ) enables reliable communication by leveraging forward error-correcting coding at the physical layer and automatic retransmissions at the data link/medium access layer based on ACK/NACK (acknowledgment/negative acknowledgment) feedback on the reverse link. With HARQ, the receiver can store previously received packets. The receiver can use the stored packets for joint processing (e.g., combining) with the last received packet (e.g., current packet) in order to enhance the decoding reliability. Examples of HARQ mechanisms include Chase combining HARQ and Incremental Redundancy (IR) HARQ.

For HARQ Chase combining (also referred to as Chase-HARQ), the transmitter (e.g., the encoder) repeats the same packet at each retransmission. The receiver (e.g., the decoder) performs decoding (e.g., attempts to decode) a packet by combining all previously received packets. For example, the decoder combines current received retransmitted packets with an original (e.g., previously received and stored) erroneously transmitted packet from a previous transmission, where the retransmissions are identical copies of the original transmission. This may involve all previously received packets of the current combined packet obtained from all previous transmissions.

For HARQ IR combining (also referred to as IR-HARQ), at each retransmission, the transmitter sends a packet consisting of new parity bits. The receiver stores all the previously received packets. For example, additional redundant information is transmitted in each retransmission to increase a channel coding gain, where the retransmissions consist of new parity bits from the channel encoder. Different bits (e.g., new parity bits) can be transmitted by employing a different rate matching (puncturing) pattern, for example, which results in a smaller effective code rate of the stream.

Figure 11:
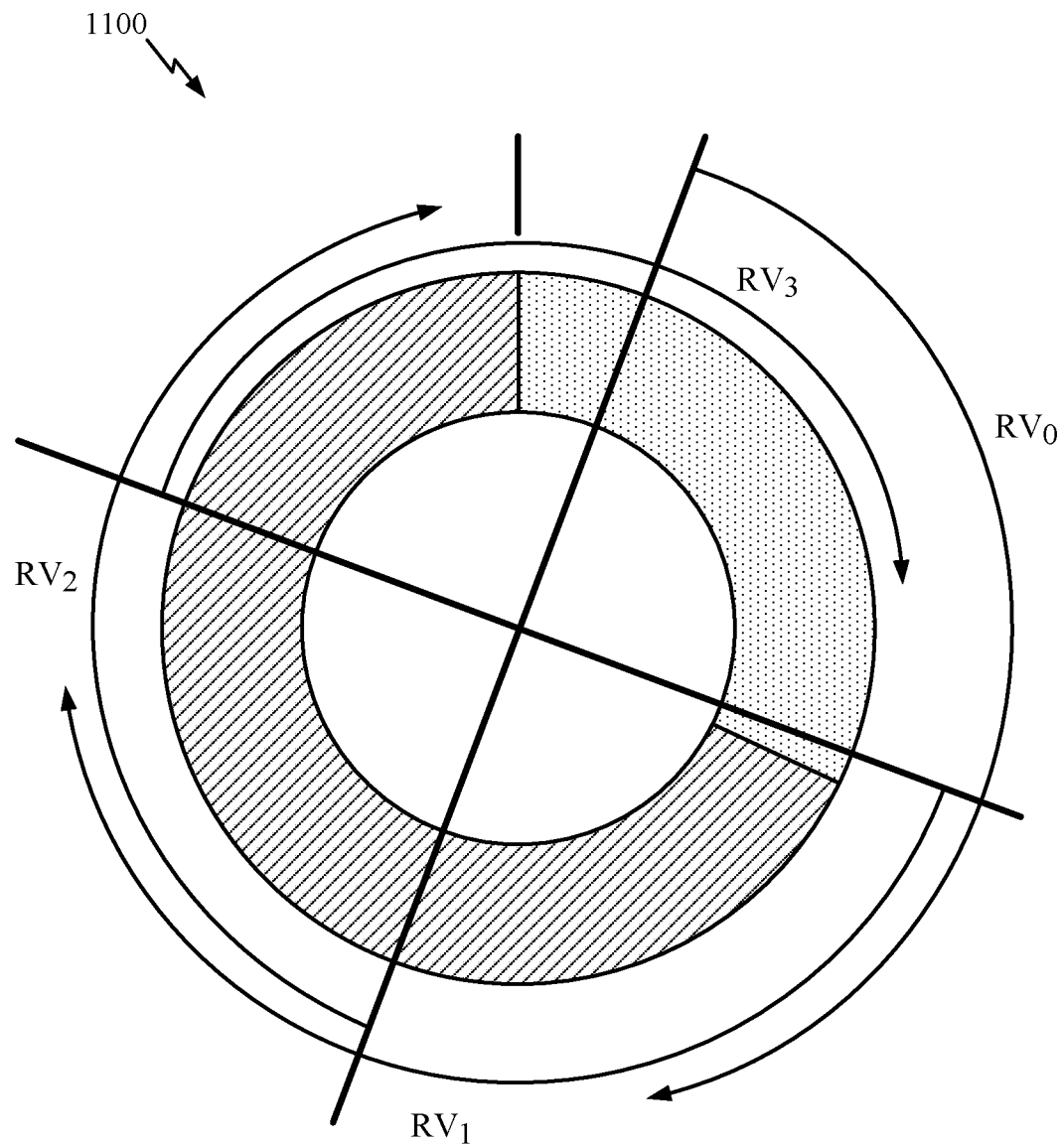
FIG. 11 is a representation of an example hybrid automatic repeat request (HARQ) buffer with interleaved bits, systematic bits, and redundant bits, in accordance with certain aspects of the present disclosure.

FIG. 11 is a representation 1100 of a HARQ LLR circular buffer based on a turbo code and rate matching scheme. As shown in FIG. 11, systematic bits and redundant bits can be interleaved. Systematic bits are the original input data bits, while parity bits (e.g., parity packets) are used to find/correct errors that may occur during data transmission. With Chase combining, the same RV index is sent. IR-HARQ may be based on a redundancy version (RV) sequence 0, 2, 3, 1 and Chase/ARQ may be based on RV sequence 0, 0, 0, 0 (no LLR combining for ARQ). Note that, the proposed scheme works with other channel coding schemes as well, such as LDPC, convolutional and polar codes.

One challenge to implementing HARQ is storage of data from previously received packets in a HARQ buffer at the receiver. Buffered packets at the receiver can be represented by quantizing log likelihood ratios (LLRs) of the coded bits. The LLR is a soft decision that indicates the likelihood of the coded bit being a 1 or 0. In certain systems (e.g., long term evolution (LTE) systems), LLRs for an entire round trip time (RTT) duration (e.g., 8-10 ms for LTE) may be buffered (e.g., stored in a buffer). The LLRs may be buffered, for example, in the physical layer (PHY) HARQ LLR buffer. In addition, for radio link control (RLC) ARQ, data may also be stored, for example, in the higher layer reordering buffer. For example, data may be stored for up to two back-to-back HARQ processes of up to four retransmissions each (e.g., 60-100 ms worth of data for LTE).

The difficulty increases as transmission rates increase and larger bandwidth is used. The buffer size may be based on the data throughput, buffer duration, number of interlaces, and LLR bitwidth. Scaling up the LTE HARQ/ARQ design can incur large buffer cost. Certain systems may support higher throughput rates (e.g., NR systems including 5G systems). In one example, if the throughput is scaled by a factor of ten (10 Gbps as compared to 1 Gbps), the overhead may be increased also by a factor of ten for the same buffer duration, number of interlaces, and LLR bitwidth.

Accordingly, techniques and apparatus for buffer management are desirable, for example, to reduce overhead buffer size cost for systems supporting high throughput.

Certain aspects of the present disclosure discuss techniques for HARQ buffer and reordering buffer management, including low-bitwidth LLR quantization design and a shared HARQ LLR and RLC (ARQ) reordering buffer.

Example Low-Bitwidth LLR Quantization Design

FIG. 12 illustrates example operations 1200 that may be performed by a receiver (e.g., decoder), such as a wireless node (e.g., UE 206 or BS 204), for reducing overhead buffer size, in accordance with certain aspects of the present disclosure.

Operations 1200 begin, at 1202, by receiving one or more packets of at least one of an initial transmission or a retransmission. At 1204, the wireless node forms one or more log likelihood ratios (LLRs) based on the one or more packets. At 1206, the wireless node compresses the one or more LLRs by quantizing the one or more LLRs. At 1208, the wireless node buffers the one or more compressed LLRs. Examples of LLR soft buffer management include IR-HARQ with heavy non-uniform multi-level quantization (e.g., 3-level quantization or 2-level (1-bit) quantization). This can result in a net coding gain ($E_b/N_o$ gain) of IR-HARQ offsets and/or low precision LLR buffering over Chase combining.

Figure 13:
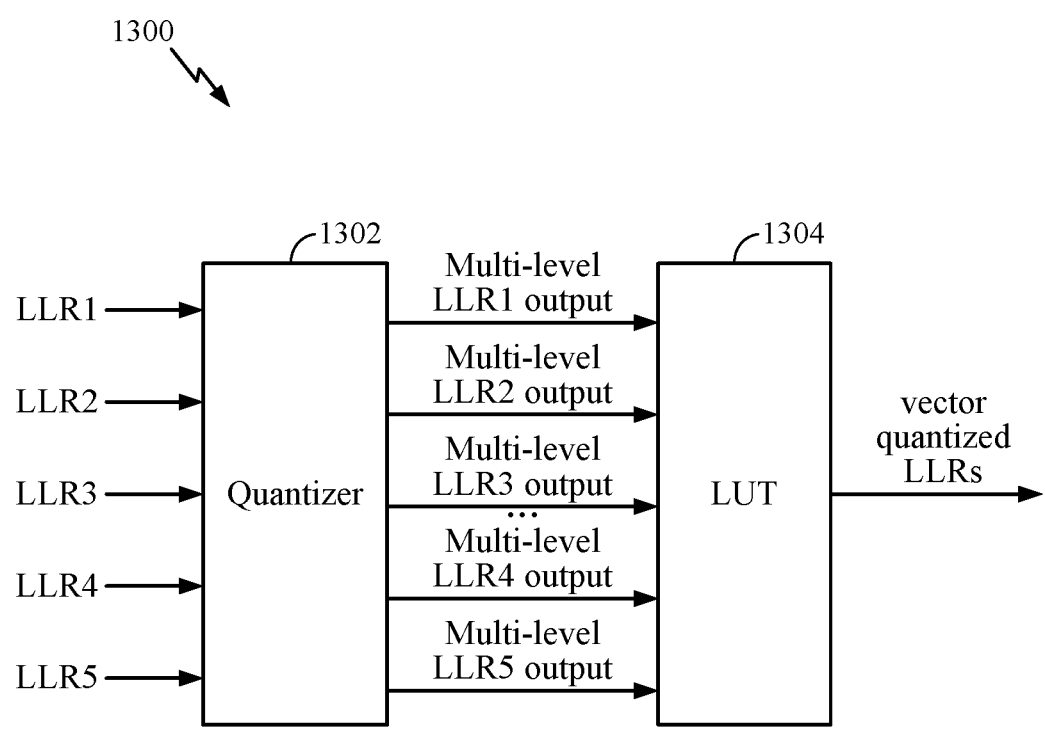
FIG. 13 is a block diagram illustrating example 3-level LLRs compressed to binary format, in accordance with certain aspects of the present disclosure.

According to certain aspects, a low-bitwidth LLR quantization design can be used. In one example implementation, LLRs can be quantized to multiple levels, such as 3-levels (e.g., for three possibilities such as −LLR, 0, LLR or represented as 0, 1, 2). This provides performance gain over binary 1-bit LLR quantization. FIG. 13 is a block diagram illustrating 3-level LLRs compressed into binary format, in accordance with certain aspects of the present disclosure. For example, as shown in FIG. 13, groups of five LLRs (LLR1-LLR5) can be input to the quantizer 1302 and quantized to 3-levels (multi-level LLR1-LLR5 output). In this case, there are $3^5=243$ possible combinations for the 5 LLRs each having 3 possibilities. Converting this to a binary format, the 243 possible combinations are <256 combinations and, therefore, can be mapped to 8-bits using a look up table (LUT) 1304 to output the quantized LLR vector. Thus, every 5 LLRs may be quantized to 3 levels and mapped to 8 bits. Each LLR may be represented by 8/5=1.6 bits per LLR. Thus, 1.6 bits can be used to store each LLR. This may be roughly half the number of bits used to store 3-bit LLRs. Compared with Chase combining, this represents significant performance gain.

In another example implementation, groups of 2 LLRs can be compressed. For example, one LLR can be quantized to 3-levels and another LLR can be quantized to 5-levels. Thus, the number of combinations for LLRs is 3×5=15 (a 4-bit value). In this case, the LLRs can be compressed into a 4-bit storage unit. Alternatively, one LLR can be quantized to 2-levels and compressed to 1-bit.

Figure 14:
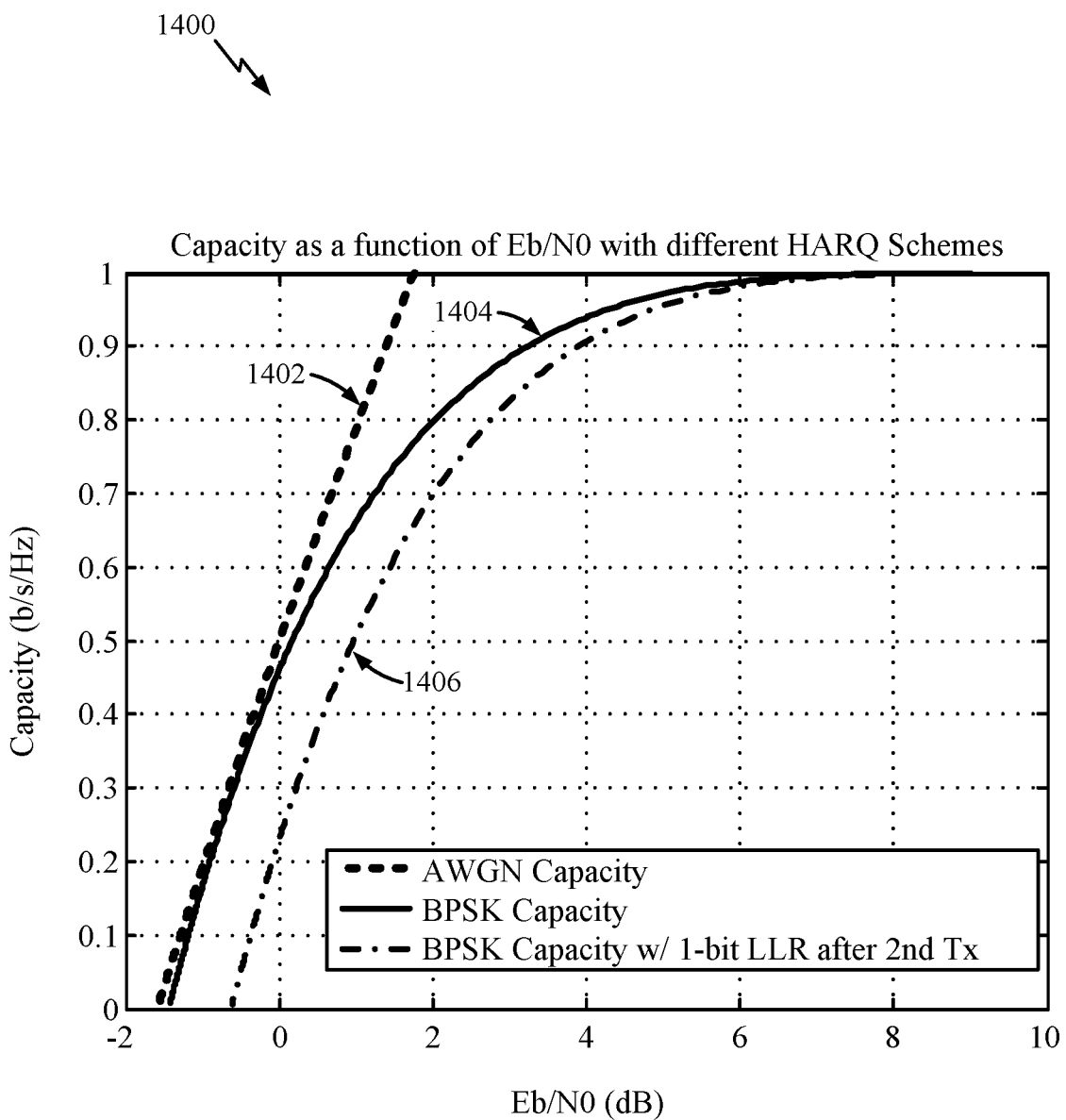
FIG. 14 is a graph illustrating example performance of HARQ incremental redundancy (IR) combining, in accordance with certain aspects of the present disclosure.

Thus, HARQ IR with quantized LLRs may have gain over Chase combining. The graph 1400 in FIG. 14 illustrates an example of the performance gap between Chase combining and IR HARQ. Graph 1400 shows an Eb/N0 versus capacity curve representing efficiency of various coding schemes. Curve 1402 represents the Additive White Gaussian Noise channel (AWGN) capacity curve. Curve 1404 represents the Binary Phase Shift Keying (BPSK) Capacity curve. Curve 1406 represents the BPSK capacity curve with 1-bit LLR quantization after the second transmission (that is the first two transmission LLRs are quantized and the third transmission LLR is still in full precision).

As shown in FIG. 14, Eb/N0 gain by going to a lower coding rate may offset the loss due to heavy LLR quantization. An even larger gap may be expected over fading channels due to high rate capacity saturation. For a high reliability 5G HARQ design, a high coding rate (e.g., modulation and coding scheme (MCS)) can use IR HARQ to achieve Eb/N0 gain. Aggressive LLR quantization can be used to manage buffer size. Net coding gain (e.g., Eb/N0 gain) of IR HARQ with heavy quantization may be used to offset low precision LLR buffering over Chase-HARQ. Low coding Chase-HARQ combining may incurs limited Eb/N0 loss and at the same time provides reasonable performance compared with IR HARQ.

According to certain aspects, the UE can signal to the BS (e.g., a gNB) it's capability to compress the LLR buffer (i.e., perform LLR quantization and compression). This may allow higher throughput to be achieved for a given soft buffer constraint. The UE may signal its preferred lowest code rate after HARQ transmissions along with the maximum soft buffer size. Thus, the BS may be able to distinguish (e.g., determine) the lowest code rate to support at different throughout levels.

Example Shared HARQ LLR and Reordering Buffer

According to certain aspects, a joint HARQ LLR and ARQ reordering buffer (e.g., across the medium access control (MAC), radio link control (RLC), and packet data convergence protocol (PDCP) protocol layers) can be used. FIG. 15 illustrates example operations 1500 that may be performed by a receiver, such as a wireless node (e.g., UE 206 or BS 204), for reducing overhead buffer size, in accordance with certain aspects of the present disclosure.

Operations 1500 begin, at 1502, by receiving an initial transmission or a retransmission comprising one or more transmission blocks on at least one of multiple component carriers (CCs) or multiple hybrid automatic repeat request (HARQ) interlaces. At 1504, the wireless node attempts to decode the one or more transmission blocks. At 1506, the wireless node determines whether the one or more transmission blocks were successfully decoded. At 1508, the wireless node stores soft log likelihood ratios (LLRs) associated with transmission blocks that failed to successfully decode in a shared buffer. At 1510, the wireless node stores transmission blocks that were successfully decoded out-of-order in the shared buffer.

According to certain aspects, the UE may signal, to the BS (e.g., a gNB), it's capability to manage a joint LLR and RLC buffer (e.g., capability to store the LLRs and transmission blocks that were successfully decoded out-of-order in the shared buffer). Thus, the BS may know (e.g., determine) that the UE qualifies as a higher UE category and may be capable of achieving higher throughput for a given soft LLR buffer and RLC buffer constraint.

Figure 16:
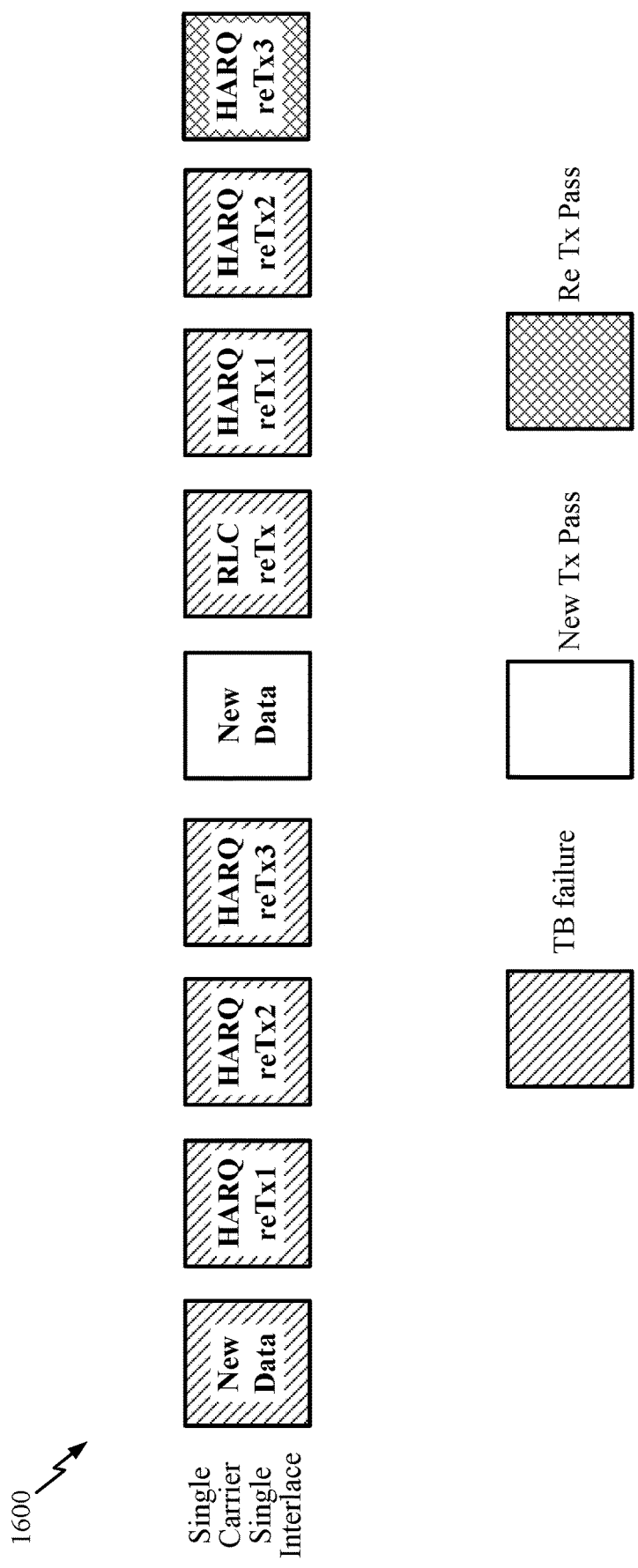
FIG. 16 illustrates example decoding results for a single HARQ interlace on a single component carrier (CC), in accordance with certain aspects of the present disclosure.
Figure 17:
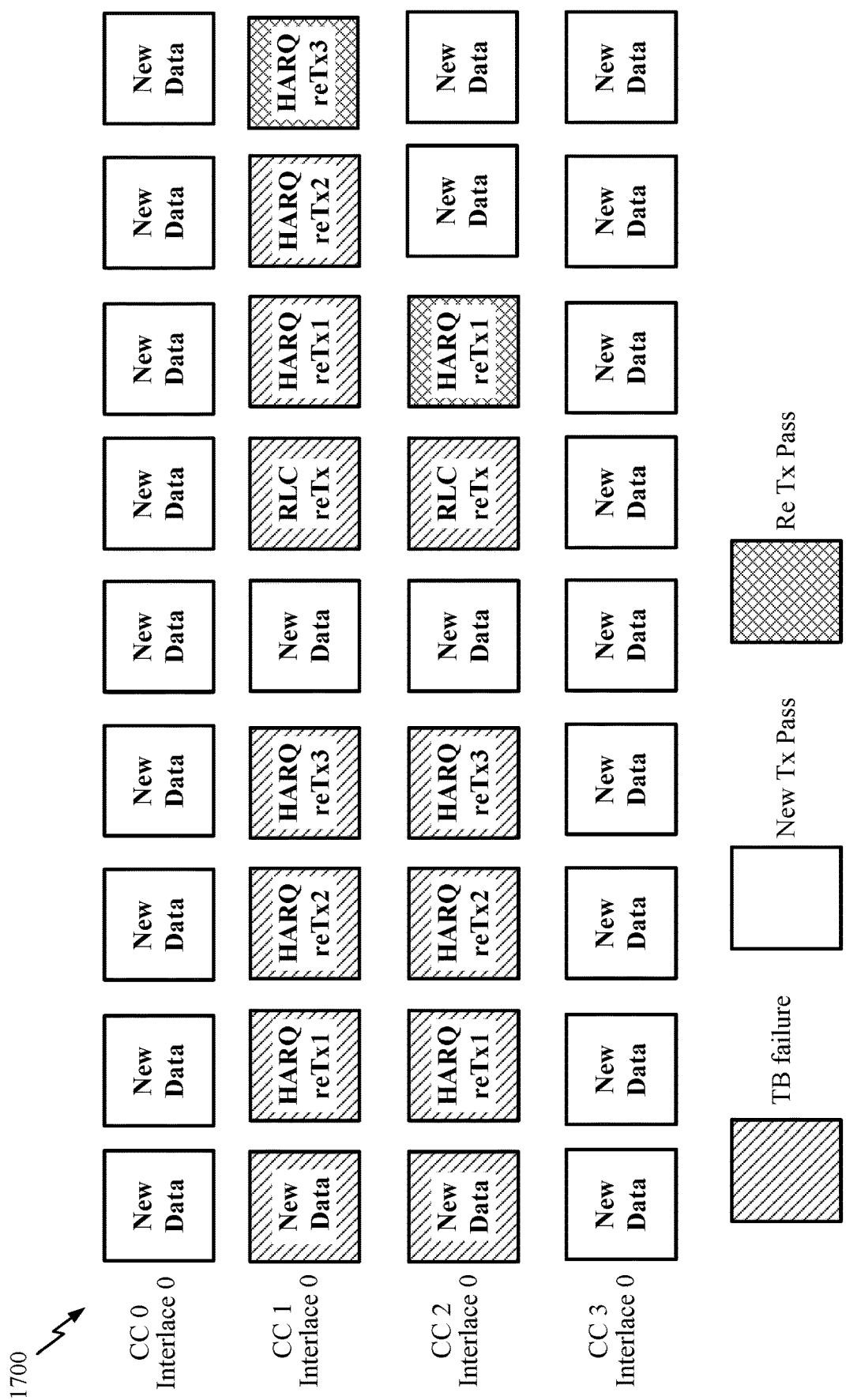
FIG. 17 illustrates example decoding results for a single HARQ interlace on multiple CCs, in accordance with certain aspects of the present disclosure.

FIG. 16 illustrates a PHY HARQ interlace on single CC and FIG. 17 illustrates a PHY HARQ interlace on multiple CCs. Although a single PHY HARQ interlace is shown, there could also be multiple PHY HARQ interlaces. The out-of-order delivery issue may still exist for multi-interlace or carrier aggregation (CA) cases. As shown in FIG. 17, a transport block (TB) may be HARQ retransmitted until it passes (e.g., is successfully received/decoded, which may be until an ACK is received by the transmitter) or until the HARQ retransmissions fails a certain number of times (e.g., after a threshold number of retries or expiry of a timer). LLRs corresponding to failed transmissions and/or retransmissions may be stored (e.g., in the HARQ LLR buffer). After failing PHY HARQ retransmission, the TB may be sent to the RLC layer for retransmission until the TB passes. In some cases, the RLC retransmissions may also fail. In the example shown in FIG. 17, on certain CCs (and/or HARQ interlaces), the transmissions and retransmissions keep failing (e.g., on CC1 and CC2), while transmissions on other CCs (and/or HARQ interlaces) pass (e.g., CC0 and CC3). This may lead to out of order packet delivery. Thus, a reordering buffer (e.g., the ARQ reordering buffer) may be used to store packets so that they can be reordered and delivered in order to an upper layer.

According to certain aspects, a joint (e.g., shared) HARQ LLR and RLC reordering buffer may be used to reduce overall storage overhead for HARQ operations. The HARQ LLR buffer and reordering buffer store complementary information (e.g., the HARQ LLR buffer stores failed TBs and the ARQ reordering buffer stores out of order passing TBs after a TB failure event). The shared buffer may be jointly managed at the receiver side, for example, using a same memory as dynamic partitioning memory.

Figure 18:
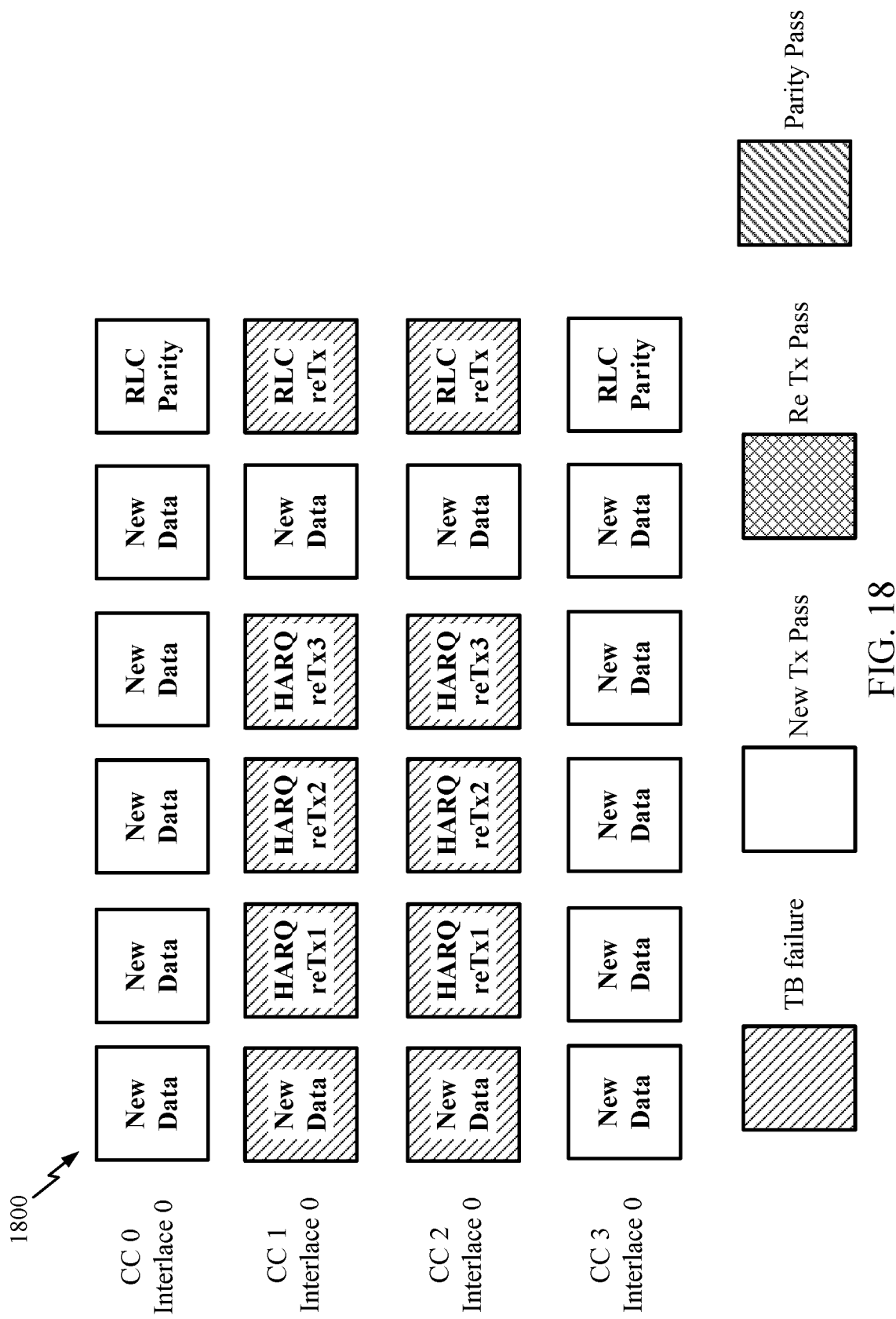
FIG. 18 illustrates example decoding results for a single HARQ interlace with parity packets on multiple CCs, in accordance with certain aspects of the present disclosure.

According to certain aspects, for RLC retransmissions, RLC retransmissions may be sent on certain CCs (and/or HARQ interlaces) and RLC parity packets (e.g., RLC PDUs) may be sent on other CCs (and/or HARQ interlaces), as shown in FIG. 18. For example, as shown in FIG. 18, RLC retransmissions are sent on CC1 and CC2, on which transmissions and retransmission keep failing, and RLC parity packets are sent on CC0 and CC3, on which transmissions and keep passing. In this case, even if the RLC retransmissions fail (e.g., on CC1 and/or CC2), some or all of the RLC parity packets (e.g., on CC0 and/or CC3) may still be successfully decoded. The successfully decoded parity packets, along with other systematic data packets, may be used to decode the lost data packets (e.g., the failed retransmissions on the other CCs). After decoding the lost data packets, the receiver may be able to send an ACK and the retransmissions can be halted.

Thus, transmission of RLC parity packets (e.g., redundant packets over multiple CCs and/or HARQ interlaces) may be used to improve reliability of data packets (e.g., due to coding gain). Further, by controlling/adjusting the amount (e.g., the number of) transmitted RLC parity packets, data transmission can be tapered down (e.g., throttle down transmission of new data throughput), for example, to limit the buffer size requirement.

On the transmitter side, a timer (e.g., a HARQ timer) can be associated with the data rate. The timer may limit the duration for attempting retransmissions of a failed TB. In aspects, for lower data rates a longer timer may be used because a smaller amount of information is being buffered, while for higher data rates a shorter timer may be used since a larger amount of information is being buffered.

FIG. 19 illustrates example operations 1900 that may be performed by a transmitter, such as a wireless node (e.g., a UE 206 or BS 204), in accordance with certain aspects of the present disclosure.

Operations 1900 begin, at 1902, by sending a retransmission on at least one of multiple CCs or HARQ interlaces. At 1904, the wireless node sends one or more parity packets associated with at least a portion of the retransmission. At 1906, retransmission is halted if an acknowledgment (ACK) is received. For example, an ACK may be received when a sufficient number of parity packets are successfully decoded in order to recover lost data packets.

Joint HARQ/ARQ buffer management may improve memory utilization efficiency. For example, when the reordering buffer watermark is low, high LLR bitwidth can be used for improved performance; and when the reordering buffer watermark is high, low LLR bitwidth can be applied in the HARQ buffer and RLC ARQ parity packets can be used on top of retransmissions to tradeoff overhead for low latency/high reliability.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for forming, means for compressing, means for receiving, means for buffering, means for storing, means for compressing, means for halting, means for quantizing, means for attempting, means for sending, and/or means for adjusting may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting and/or means for sending may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6. Means for receiving may comprise a receiver, which may include RX processor 670, receiver(s) 618, and/or the antenna(s) 620 of the wireless base station 610 illustrated in FIG. 6, and/or the RX processor 656, the receiver(s) 654, and/or the antenna(s) 652 of the user equipment 650 illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method to reduce buffer overhead, comprising:
receiving packets comprising an initial transmission and at least one incremental redundancy hybrid automatic repeat request (IR-HARQ) retransmission;
forming a plurality of log likelihood ratios (LLRs) based on the packets;
compressing the plurality of LLRs, including:
quantizing groups of five LLRs to three levels each; and
mapping each group of five quantized three-level LLRs to eight bits using a lookup table (LUT); and
buffering the compressed plurality of LLRs.

2. The method of claim 1, wherein the compressing the plurality of LLRs comprises:
quantizing the plurality of LLRs to a non-uniform multiple-level quantization.

3. A method to reduce buffer overhead, comprising:
receiving packets comprising an initial transmission and at least one incremental redundancy hybrid automatic repeat request (IR-HARQ) retransmission;
forming a plurality of log likelihood ratios (LLRs) based on the packets;
compressing the plurality of LLRs, including:
quantizing a first LLR to three levels;
quantizing a second LLR to five levels; and
mapping the first quantized three-level LLR and the second quantized five-level LLR to four bits using a lookup table (LUT); and
buffering the compressed plurality of LLRs.

4. The method of claim 1, further comprising combining the buffered compressed plurality of LLRs using IR combining.

5. The method of claim 1, wherein the buffered compressed plurality of LLRs comprise systematic bits and redundancy bits.

6. The method of claim 1, wherein:
receiving the packets comprises receiving the packets at a receive processor of a user equipment (UE),
buffering the compressed LLRs comprises storing the compressed LLRs in one or more buffers of the UE, and
the method further comprises signaling, to a base station (BS), a capability of the UE to perform the LLR compression.

7. The method of claim 1, further comprising:
signaling, to a base station (BS), a preferred minimum code rate, after HARQ transmissions, and a maximum soft buffer size.

8. A method to reduce buffer overhead, comprising:
receiving a radio link control (RLC) retransmission comprising one or more transmission blocks on at least one of multiple component carriers (CCs) or multiple hybrid automatic repeat request (HARQ) interlaces;
receiving at least one RLC parity packet associated with the RLC retransmission on at least one of a different CC or a different HARQ interlace than the RLC retransmission;
attempting to decode the one or more transmission blocks;
determining whether the one or more transmission blocks were successfully decoded;
storing soft log likelihood ratios (LLRs) associated with transmission blocks that failed to successfully decode in a shared buffer; and
storing transmission blocks that were successfully decoded out-of-order in the shared buffer.

9. The method of claim 8, wherein the shared buffer comprises a joint HARQ LLR and radio link control (RLC) reordering buffer.

10. The method of claim 8, wherein the shared buffer comprises dynamic partitioning memory.

11. The method of claim 8, further comprising:
signaling, to a base station (BS), a capability to store LLRs and transmission blocks that were successfully decoded out-of-order in the shared buffer.

12. An apparatus having reduced buffer overhead, comprising:
means for receiving packets comprising an initial transmission and at least one incremental redundancy hybrid automatic repeat request (IR-HARQ) retransmission;
means for forming a plurality of log likelihood ratios (LLRs) based on the packets;
means for compressing the plurality of LLRs, including:
quantizing groups of five LLRs to three levels each; and
mapping each group of five quantized three-level LLRs to eight bits using a lookup table (LUT); and
means for buffering the compressed plurality of LLRs.

13. The apparatus of claim 12, wherein the means for compressing the plurality of LLRs comprises:
means for quantizing the plurality of LLRs to a non-uniform multiple-level quantization.

14. An apparatus having reduced buffer overhead, comprising:
- means for receiving packets comprising an initial transmission and at least one incremental redundancy hybrid automatic repeat request (IR-HARQ) retransmission;
- means for forming a plurality of log likelihood ratios (LLRs) based on the packets;
- means for compressing the plurality of LLRs, including:
  - quantizing a first LLR to three levels;
  - quantizing a second LLR to five levels; and
  - mapping the first quantized three-level LLR and the second quantized five-level LLR to four bits using a lookup table (LUT); and
- means for buffering the compressed plurality of LLRs.

15. The apparatus of claim 12, further comprising means for combining the buffered compressed plurality of LLRs using IR combining.

16. The apparatus of claim 12, wherein the buffered compressed plurality of LLRs comprise systematic bits and redundancy bits.

17. An apparatus having reduced buffer overhead, comprising:
- means for receiving a radio link control (RLC) retransmission comprising one or more transmission blocks on at least one of multiple component carriers (CCs) or multiple hybrid automatic repeat request (HARQ) interlaces;
- means for receiving at least one RLC parity packet associated with the RLC retransmission on at least one of a different CC or a different HARQ interlace than the RLC retransmission;
- means for attempting to decode the one or more transmission blocks;
- means for determining whether the one or more transmission blocks were successfully decoded;
- means for storing soft log likelihood ratios (LLRs) associated with transmission blocks that failed to successfully decode in a shared buffer; and
- means for storing transmission blocks that were successfully decoded out-of-order in the shared buffer.

18. The apparatus of claim 17, wherein the shared buffer comprises a joint HARQ LLR and radio link control (RLC) reordering buffer.

19. The apparatus of claim 17, wherein the shared buffer comprises dynamic partitioning memory.

* * * * *